US012474257B2

(12) United States Patent
Catheline et al.

(10) Patent No.: US 12,474,257 B2
(45) Date of Patent: Nov. 18, 2025

(54) DETERMINING A PROPERTY OF A GAS PLUME PRODUCED BY BURNING HYDROCARBON EFFLUENT

(71) Applicant: Schlumberger Technology Corporation, Sugar Land, TX (US)

(72) Inventors: Sebastien Catheline, Clamart (FR); Francis Allouche, Clamart (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 143 days.

(21) Appl. No.: 18/548,955

(22) PCT Filed: May 19, 2021

(86) PCT No.: PCT/US2021/033066
§ 371 (c)(1),
(2) Date: Sep. 5, 2023

(87) PCT Pub. No.: WO2022/186844
PCT Pub. Date: Sep. 9, 2022

(65) Prior Publication Data
US 2024/0151640 A1 May 9, 2024

Related U.S. Application Data

(60) Provisional application No. 63/200,427, filed on Mar. 5, 2021.

(51) Int. Cl.
*G01N 21/39* (2006.01)
*G01N 21/31* (2006.01)
*G01N 21/3504* (2014.01)

(52) U.S. Cl.
CPC ........... *G01N 21/314* (2013.01); *G01N 21/39* (2013.01); *G01N 2021/3513* (2013.01)

(58) Field of Classification Search
CPC .............. G01N 21/314; G01N 21/39; G01N 2021/3513
See application file for complete search history.

(56) References Cited

U.S. PATENT DOCUMENTS

| 5,591,975 | A | 1/1997 | Jack et al. |
| 6,995,846 | B2 | 2/2006 | Kalayeh et al. |
| (Continued) | | | |

FOREIGN PATENT DOCUMENTS

WO 2021023971 A1 2/2021

OTHER PUBLICATIONS

Search Report and Written Opinion of International Patent Application No. PCT/US2021/033066 dated Dec. 7, 2021, 17 pages.
(Continued)

*Primary Examiner* — David P Porta
*Assistant Examiner* — Fani Polyzos Boosalis
(74) *Attorney, Agent, or Firm* — Jeffrey D. Frantz

(57) ABSTRACT

Gas monitoring systems (500) and methods for determining a burning hydrocarbon effluent gas plume property. A laser emission system emits laser beams (564) along a path through the plume (532). A detection system facilitates determining intensity data indicative of intensities of the laser beams (564) backscattered by a surface (522) after passing through the plume (532). The laser emission system emits a first laser beam (564) along the path while tuning its wavelength around a wavelength corresponding to a $CO_2$ spectral absorption line. The laser emission system emits a second laser beam (564) along the path while tuning its wavelength around a wavelength corresponding to a spectral absorption line of a second predetermined gas. The processing system determines a first concentration path length of the $CO_2$ based on the first intensity data, a second concentration path length of the second predetermined gas based on the
(Continued)

second intensity data, and the plume property based on the determined concentration path lengths. The plume property may be the rate of emission of the second predetermined gas or the combustion efficiency.

19 Claims, 9 Drawing Sheets

(56) References Cited

U.S. PATENT DOCUMENTS

| | | | |
|---|---|---|---|
| 9,225,915 | B2 | 12/2015 | Zeng et al. |
| 2004/0065835 | A1* | 4/2004 | Rich ..................... G01N 21/05 250/343 |
| 2014/0160479 | A1 | 6/2014 | Hager et al. |
| 2018/0209853 | A1 | 7/2018 | Kraus et al. |

OTHER PUBLICATIONS

International Preliminary Report on Patentability of International Patent Application No. PCT/US2021/033066 dated Sep. 14, 2023, 12 pages.

* cited by examiner

DETERMINING A PROPERTY OF A GAS PLUME PRODUCED BY BURNING HYDROCARBON EFFLUENT

This application claims priority to and the benefit of U.S. Provisional Application No. 63/200,427, titled "QUANTIFYING GASES PRODUCED BY BURNING HYDROCARBON BASED ON OPTICAL ANALYSIS, CHEMICAL COMPOSITION, AND FLOW RATE MEASUREMENT," filed Mar. 5, 2021, the entire disclosure of which is hereby incorporated herein by reference.

BACKGROUND OF THE DISCLOSURE

The global oil and gas industry is trending toward improved environmental safety and compliance throughout various phases of a well lifecycle. During exploration and appraisal of new oil and gas fields, wells are drilled and tested to assess the commercial viability of these fields. Dynamic well testing can produce a large amount of hydrocarbons to a wellsite surface. However, excess hydrocarbons cannot be stored and hydrocarbon disposal is difficult because of lack of transport infrastructure at well sites. Such problems are even more relevant in offshore operations. Thus, the most economical viable option is often to dispose of the excess hydrocarbons by burning the hydrocarbons, compromising between optimal environmental and financial constraints.

Burning hydrocarbons produces pollutant gases, such as carbon monoxide (CO), carbon dioxide ($CO_2$), nitric oxide (NO), nitrogen dioxide ($NO_2$), nitrogen trioxide ($NO_3$), and/or sulfur dioxide ($SO_2$), as well as residual unburned hydrocarbon, such as methane ($CH_4$), acetylene ($C_2H_2$), ethylene ($C_2H_4$), and propylene ($C_3H_6$). Because release of these pollutant gases into the atmosphere exacerbates the greenhouse effect, environmental protection agencies scrutinize release of these gases and oftentimes require periodic reporting of quantities of these pollutant gases that were released into the atmosphere.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces a gas monitoring system for determining a property of a gas plume produced by burning of a hydrocarbon effluent via a burning device. The gas monitoring system includes a laser emission system, a detection system, and a processing system. The laser emission system is operable to emit first and second laser beams along a path passing through the gas plume. The detection system is operable to facilitate determining first and second intensity data indicative of intensities of the first and second laser beams, respectively, that have been backscattered by a surface after passing through the gas plume. The processing system includes a processor and a memory device storing a computer program code that, when executed by the processor, causes the processing system to cause the laser emission system to emit the first laser beam along the path while tuning wavelength of the first laser beam around a first wavelength corresponding to a spectral absorption line of a first predetermined gas. The first predetermined gas is $CO_2$. The computer program code, when executed by the processor, also causes the processing system to cause the laser emission system to emit the second laser beam along the path while tuning wavelength of the second laser beam around a second wavelength corresponding to a spectral absorption line of a second predetermined gas. The computer program code, when executed by the processor, also causes the processing system to determine a first concentration path length of the first predetermined gas along the path based on the first intensity data, determine a second concentration path length of the second predetermined gas along the path based on the second intensity data, and determine the property of the gas plume based on a relationship between the first and second concentration path lengths.

The present disclosure also introduces a method for determining a property of a gas plume produced by burning of a hydrocarbon effluent via a burning device. The method includes emitting a first laser beam along a first path through the gas plume while tuning wavelength of the first laser beam around a first wavelength corresponding to a spectral absorption line of a first predetermined gas. The first predetermined gas is $CO_2$. The method also includes generating first intensity data indicative of an intensity of backscatter of the first laser beam by a surface after passing through the gas plume. The method also includes determining a first concentration path length of the first predetermined gas along the first path based on the first intensity data. The method also includes emitting a second laser beam along a second path through the gas plume while tuning wavelength of the second laser beam around a second wavelength corresponding to a spectral absorption line of a second predetermined gas. The method also includes generating second intensity data indicative of an intensity of backscatter of the second laser beam by the surface after passing through the gas plume. The method also includes determining a second concentration path length of the second predetermined gas along the second path based on the second intensity data. The method also includes determining the property of the gas plume based on a relationship between the first and second concentration path lengths.

These and additional aspects of the present disclosure are set forth in the description that follows, and/or may be learned by a person having ordinary skill in the art by reading the material herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
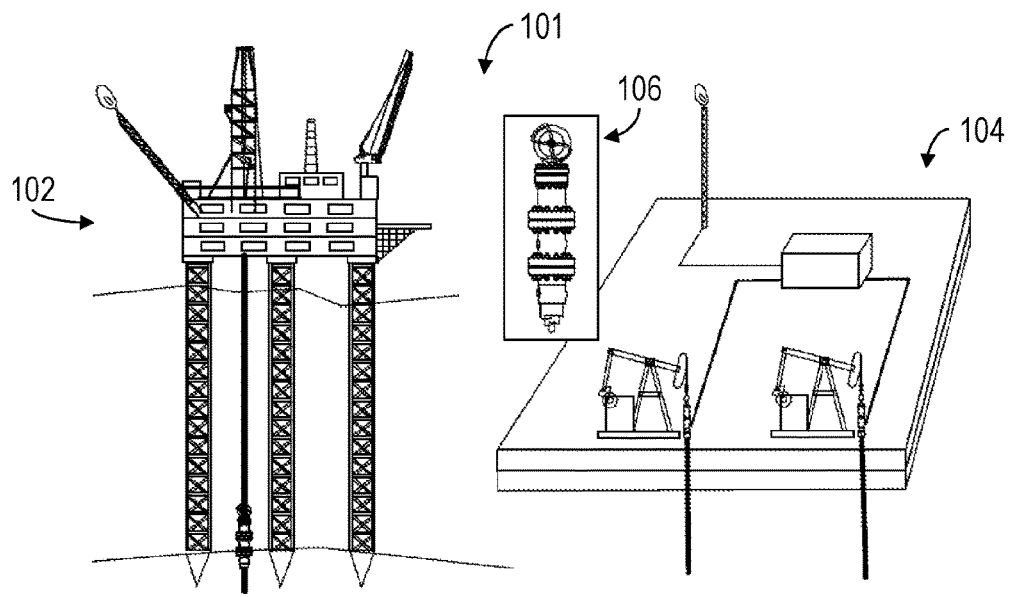
FIG. 1 is a schematic view of at least a portion of an example environment in which one or more aspects of the present disclosure may be implemented.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

FIG. 1 depicts schematic views of an example marine environment 102 (e.g., an offshore oil and gas well drilling and production rig) and an example land environment 104 (e.g., a land-based oil pumping station) related to one or more aspects of the present disclosure. The marine environment 102 and land environment 104 represent example environments 101 in which one or more aspects of the present disclosure described below may be implemented. Although not shown, the example environments 101 may also include a land-based oil and gas well drilling rig. Each of the environments 101 may include one or more surface well terminations, known as wellheads 106, each installed over and sealing a corresponding wellbore. For example, a wellhead 106 may be at a land surface or a subsea surface (e.g., an ocean bottom). Each wellhead 106 may include a system of spools, valves, and assorted adapters that, for example, can provide for pressure control of a production well. Each wellhead 106 may comprise various types of wellhead equipment such as casing and tubing heads, a production tree, and a blowout preventer, among other examples. Conduits from multiple wellheads 106 may be joined at one or more manifolds such that well fluid from multiple wells can flow in a common conduit.

At various times, a well may be tested. Well testing can include one or more of a variety of well testing operations. In various instances, well fluid can flow from a well or wells to a wellsite surface where the well fluid is subjected to one or more well testing operations and generates scrap (e.g., waste fluid) to be handled appropriately according to circumstances and/or regulations. For example, waste fluid may be loaded into a tanker for transport to a facility that can dispose of the waste fluid. Another manner of disposing waste fluid can be through burning (i.e., combustion), which can include burning of waste oil or flaring of waste gas. Burning can also or instead be part of the well testing operations, such as for analyzing well fluid, which may provide data indicative of composition and/or other characteristics of the well fluid.

For example, well testing operations can be performed during one or more phases, such as during exploration and appraisal, where production of hydrocarbons are tested using a temporary production facility that can facilitate well fluid sampling, flow rate analysis, and pressure information, such as to help characterize a reservoir. Various decisions can be based on well testing, such as decisions related to production methods and/or well productivity improvements. For example, disposal of produced hydrocarbons during well testing may be via burning, which can include on-site burning and/or off-site burning.

Well testing may be performed, for example, using equipment shown in the marine environment 102 and/or the land environment 104. As an example, an environment may be under exploration, development, and/or appraisal, where such an environment includes at least one well where well fluid can be produced (e.g., via natural pressure, fracturing, artificial lift, pumping, flooding, etc.). In such an environment, various types of equipment may be on-site, which may be operatively coupled to the well testing equipment.

Figure 2:
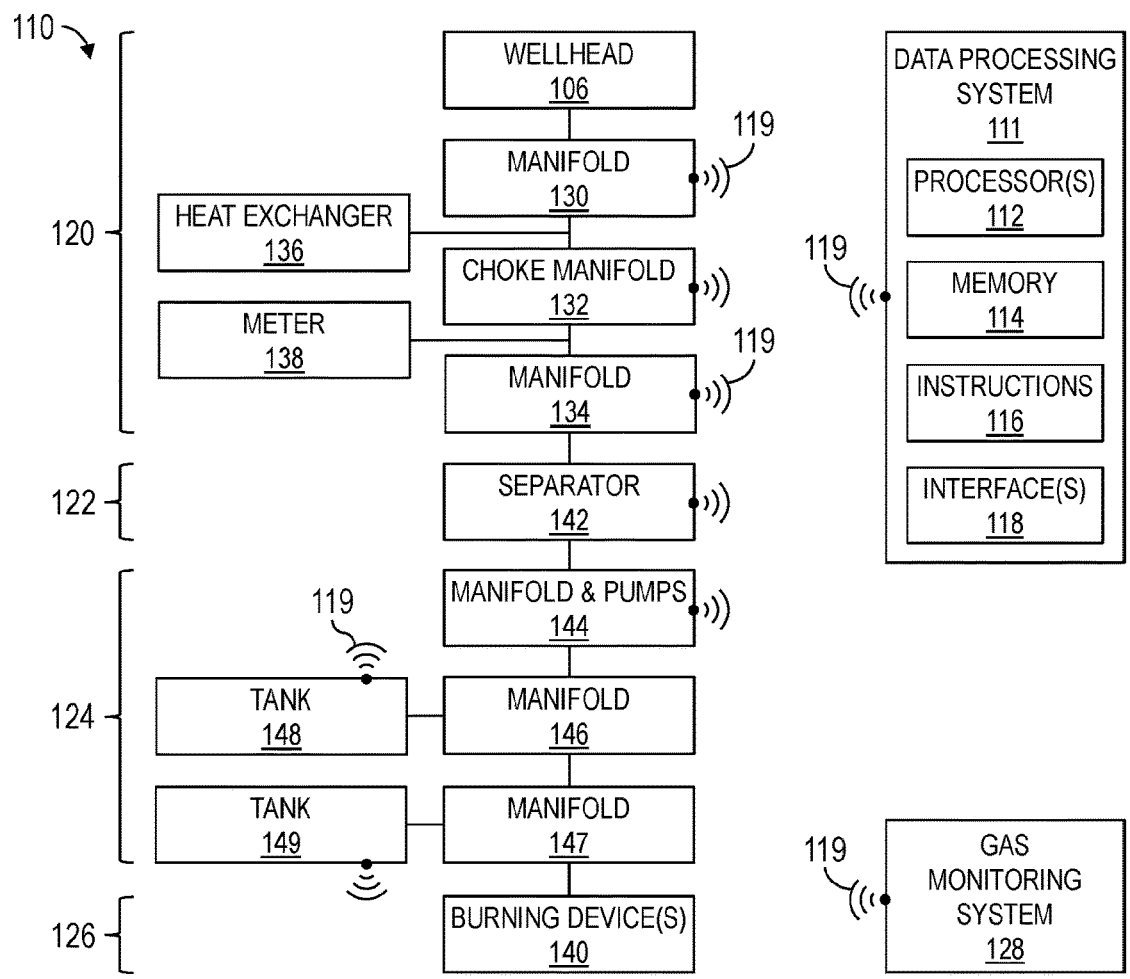
FIG. 2 is a schematic view of at least a portion of an example implementation of apparatus according to one or more aspects of the present disclosure.

FIG. 2 shows an example implementation of a well fluid processing system 110 related to one or more aspects of the present disclosure and represents an example environment in which one or more aspects of the present disclosure described below may be implemented. The well fluid processing system 110 may be or form at least a portion of a well fluid testing system or otherwise be utilized for testing and disposing of fluid received from a well.

The well fluid processing system 110 may be fluidly connected with and receive well fluid via a wellhead 106 or the well fluid processing system 110 may be fluidly connected with and receive well fluid via other fluid conduit for transporting well fluid discharged from a well. The well fluid processing system 110 may comprise a data processing (i.e., computing) system 111, which may include one or more processors 112, memory 114 accessible to at least one of the one or more processors 112, instructions (i.e., a computer program code) 116 that can be stored in the memory 114 and executed by at least one of the one or more processors 112, and one or more communication interfaces 118. The well fluid processing system 110 may comprise various wired and/or wireless communication means 119 operable to transmit and/or receive information (e.g., sensor data, control commands, etc.), for example, to and/or from the data processing system 111. The data processing system 111 may be or comprise a controller that can issue control instructions to one or more pieces of equipment in an environment, such as the marine environment 102 and/or the land environment 104. The data processing system 111 may be local, may be remote, or may be distributed such that it is in part local and in part remote.

The well fluid processing system 110 may comprise various segments that may be categorized operationally, such as a well control segment 120, a separation segment 122, a fluid management segment 124, and a burning segment 126. The well control segment 120 may comprise an assembly of various components such as a manifold 130 connected to the wellhead 106, a choke manifold 132, a heat exchanger 136 connected between the manifold 130 and the choke manifold 132, a manifold 134, and a meter 138 connected between the choke manifold 132 and the manifold 134. The separation segment 122 may comprise a separator 142 connected to the manifold 134. The fluid management segment 124 may comprise an assembly of various components such as manifolds and pumps 144 connected to the separator 142, a tank 148, a manifold 146 connected between the tank 148 and the manifolds and pumps 144, a tank 149, and a manifold 147 connected between the tank 149 and the manifold 146. The burning segment 126 may comprise one or more burning devices 140 (i.e., combustion devices) connected to the manifold 147.

The well fluid processing system 110 may comprise or operate in conjunction with a gas monitoring system 128 operable to monitor various properties of a gas plume produced by the burning well fluids (e.g., oil and/or gas) during burning operations performed by the one or more burning devices 140 (e.g., oil burners, gas flares, etc.). For example, the gas monitoring system 128 may be operable to monitor concentrations and/or rates at which various individual component gases within or forming the gas plume are produced (i.e., emitted) by the burning of the well fluids via the one or more burning devices 140. The gas monitoring system 128 may also or instead be operable to monitor efficiency of burning (i.e., combustion efficiency) of the well fluids by the one or more burning devices 140. At least a portion of the gas monitoring system 128 may be located and/or operate in association with the one or more burning devices 140, such as may permit the gas monitoring system 128 to monitor the various properties of the gas plume. The data processing system 111 may operate in conjunction with the gas monitoring system 128 or the data processing system 111 may be or form a portion of the gas monitoring system 128. The data processing system 111 may be communicatively connected with the gas monitoring system 128 and operable to receive and process sensor data from the gas monitoring system 128.

The well fluid processing system 110 may comprise various features for performing well testing operations, including less features, more features, and/or alternative features than as shown in FIG. 2. For example, the well fluid processing system 110 may comprise one or more of a gas specific gravity meter, a water-cut meter, a gas-to-oil ratio sensor, a carbon dioxide sensor, a hydrogen sulfide sensor, or a shrinkage measurement device. Various features may be upstream and/or downstream of the separator segment 122 or the separator 142.

The flow of a well fluid containing hydrocarbons from a well via the wellhead 106 may be received by the well control segment 120 and then routed via one or more conduits to the separation segment 122. The heat exchanger 136 of the well control segment 120 may be implemented as a steam-heat exchanger and the meter 138 may be operable to measure flow of well fluid through the well control segment 120. The well fluid from the well may be a single phase or multiphase fluid (i.e., two or more of oil, water, and gas). The well control segment 120 may convey the well fluid received from one or more wells to the separator 142, which may comprise one or more features for facilitating separation of components of incoming well fluid (e.g., diffusers, mist extractors, vanes, baffles, precipitators, etc.). The separator 142 may be a horizontal separator or a vertical separator. The separator 142 may be a two-phase separator (e.g., for separating gases and/or liquids) or a three-phase separator (e.g., for separating gas, oil, and/or water). The separator 142 may be used to substantially separate multiphase fluid into its oil, gas, and water phases, wherein each phase emerging from the separator 142 may be referred to herein as a separated well fluid. Such separated well fluids may be routed away from the separator 142 to the fluid management segment 124. Sometimes, the separated well fluids may not be entirely homogenous. For example, separated gas exiting the separator 142 may include some residual amount of water or oil, separated water exiting the separator 142 may include some amount of oil or entrained gas, and separated oil leaving the separator 142 may include some amount of water or entrained gas.

The well fluid management segment 124 may include flow control equipment, such as various manifolds and pumps 144 for receiving well fluids from the separator 142 and conveying the well fluids to other destinations, including additional manifolds 146, 147 for routing the well fluid to and from fluid tanks 148, 149. Although the fluid management segment 124 is shown comprising two manifolds 146, 147 and two tanks 148, 149, it is noted that the fluid management segment 124 may comprise a different number of manifolds 146, 147 and tanks 148, 149. For example, in one implementation, the fluid management segment 124 may comprise a single manifold and a single tank, while in other implementations, the fluid management segment 124 may comprise more than two manifolds and/or more than two tanks. The manifolds and pumps 144 may comprise a variety of manifolds and pumps, such as a gas manifold, an oil manifold, an oil transfer pump, a water manifold, and/or a water transfer pump. In at least some implementations, the manifolds and pumps 144 may be used to route well fluids received from the separator 142 to one or more of the fluid tanks 148, 149 via one or more of the additional manifolds 146, 147, and to route well fluids between the tanks 148, 149. The manifolds and pumps 144 may comprise features for routing well fluids received from the separator 142 directly to the one or more burning devices 140 for burning gas and oil (e.g., bypassing the tanks 148, 149) or for routing well fluids from one or more of the tanks 148, 149 to the one or more burning devices 140.

As noted above, components of the well fluid processing system 110 may vary between different applications and/or equipment within each functional group, or the well fluid processing system 110 may vary between different applications. For example, the heat exchanger 136 may be provided as part of the separation segment 122 instead of the well control segment 120.

The well fluid processing system 110 may form at least a portion of or operate in conjunction with a surface well testing system. The well fluid processing system 110 may be monitored and controlled remotely, such as via sensors and actuators installed in association with the segments 120, 122, 124, 126 and/or individual components of the well fluid processing system 110. For example, a dedicated monitoring system (e.g., sensors, communication systems, human-machine interfaces, etc.) may facilitate monitoring of one or more of the segments 120, 122, 124 126.

Figure 3:
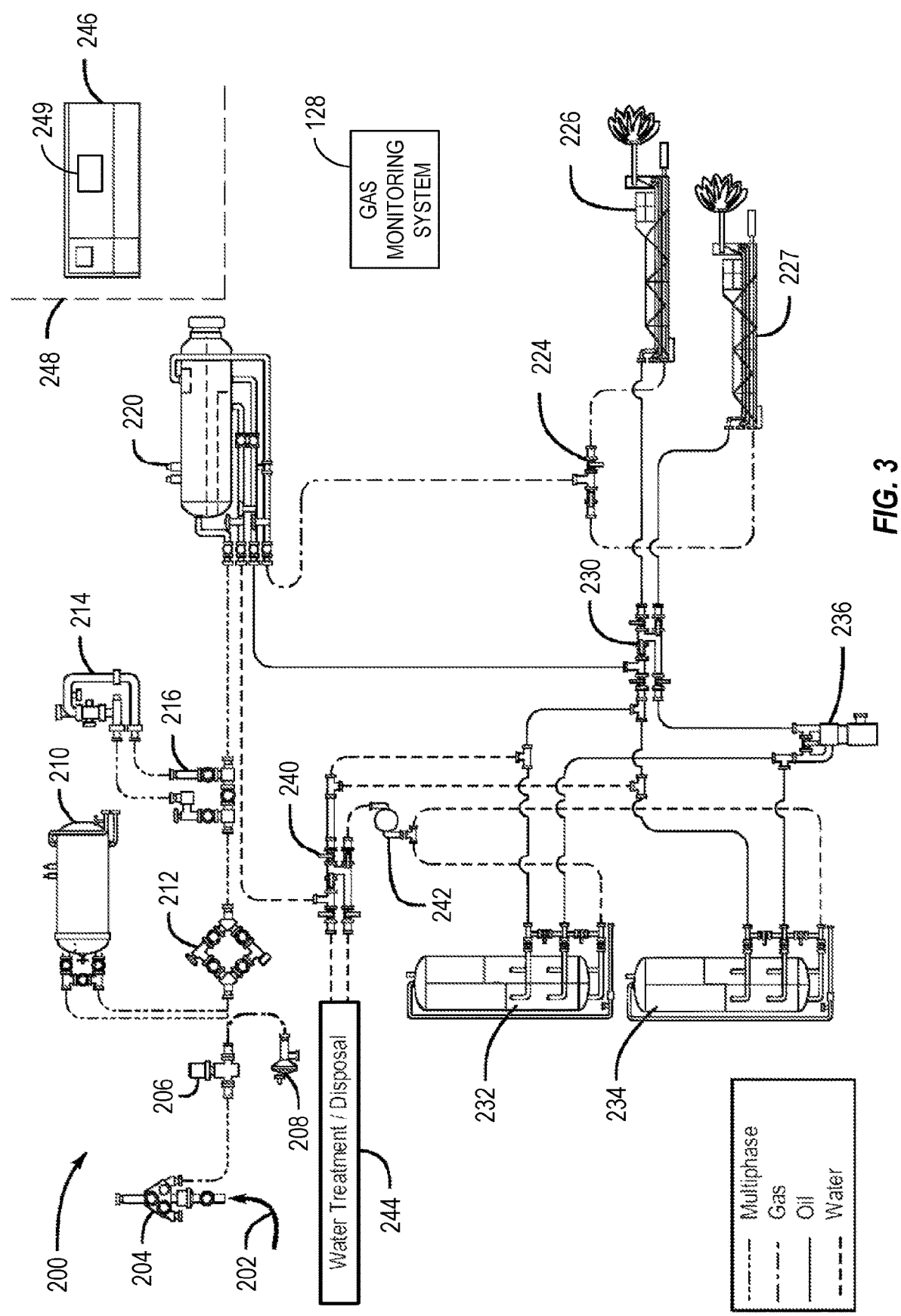
FIG. 3 is a schematic view of at least a portion of an example implementation of apparatus according to one or more aspects of the present disclosure.

FIG. 3 shows an example implementation of a well fluid processing system 200 according to one or more aspects of the present disclosure. The system 200 may be utilized for testing a well fluid received from a well or the system 200 may be or form at least a portion of a well fluid testing system. The system 200 may be an example implementation of the well fluid processing system 110 shown in FIG. 2 or the system 200 may comprise one or more features of the well fluid processing system 110. The area in which the system 200 is installed may be classified as a hazardous area. In some implementations, the well test area may be classified as a Zone 1 hazardous area according to International Electrotechnical Commission (IEC) standard 60079-10-1: 2015.

The system 200 may receive a multiphase well fluid (represented by arrow 202) from a well via a flowhead 204. The well fluid 202 may then be directed to a separator 220 through a surface safety valve 206, a steam-heat exchanger 210, a choke manifold 212, a flow meter 214, and an additional manifold 216. The system 200 may further comprise a chemical injection pump 208 for injecting chemicals into the multiphase well fluid flowing toward the separator 220. The separator 220 may be a three-phase separator operable to separate the multiphase well fluid 202 into gas, oil, and water components.

The separated gas may be directed downstream from the separator 220 through a gas manifold 224 to either of burning devices 226, 227 for burning (i.e., flaring). The gas manifold 224 may comprise valves that can be actuated to control gas flow from the gas manifold 224 to one or the other of the burning devices 226, 227 (e.g., oil burners, gas flares, etc.). Although the burning devices 226, 227 are shown adjacent each other for the sake of clarity, the burning devices 226, 227 may be positioned apart from each other, such as on opposite sides of a rig or other wellsite installation. The separated oil from the separator 220 may be directed downstream to an oil manifold 230 comprising valves that can be operated to permit oil flow to either of the tanks 232, 234 or to either of the burning devices 226, 227 for burning. The tanks 232, 234 may be or comprise vertical surge tanks, each having two fluid compartments, or the tanks 232, 234 may comprise other suitable forms. Each tank 232, 234 may be configured to simultaneously hold different well fluids, such as water in a first compartment and oil in a second compartment. An oil transfer pump 236 may be operated to pump oil through the system 200 downstream of the separator 220. The separated water from the separator 220 may be directed to a water manifold 240. Like the oil manifold 230, the water manifold 240 may comprise valves that can be opened or closed to permit water flow to either of the tanks 232, 234 or to a water treatment and disposal apparatus 244. A water transfer pump 242 may be used to pump the water through the system 200.

The system 200 may comprise or operate in conjunction with a control center 246 containing equipment for monitoring and/or controlling the system 200. For example, the control center 246 may comprise data acquisition and/or control equipment for monitoring and/or controlling the system 200. The control center 246 may be set in a non-hazardous area 248 apart from the hazardous well test area containing the other equipment of the well testing system 200. The control center 246 may contain or comprise a data processing system 249 for monitoring and/or controlling the system 200. Various types of information may be automatically acquired from sensors of the system 200 and then processed by the data processing system 249. The data processing system 249 may provide various functions, such as a sensor data display, video display, sensor or video information interpretation for quality-assurance and quality-control purposes, and data input devices for manual entry of various operational parameters and set-points.

The system 200 may be monitored during well testing operations to verify proper operation and facilitate control of the well testing operations. Such monitoring may include taking numerous measurements during a well test, examples of which can include choke manifold temperature and pressures (upstream and downstream), heat exchanger temperature and pressure, separator temperature and pressures (static and differential), oil flow rate and volume from the separator, water flow rate and volume from the separator, and fluid levels in tanks.

The system 200 may comprise or operate in conjunction with a gas monitoring system 128 operable to monitor various properties of a gas plume produced by the burning well fluids (e.g., oil and/or gas) during burning operations performed by one or more of the burning devices 226, 227. For example, the gas monitoring system 128 may be operable to monitor concentrations and/or rates at which various individual component gases within or forming the gas plume are produced (i.e., emitted) by the burning of the well fluids via one or more of the burning devices 226, 227. The gas monitoring system 128 may also or instead be operable to monitor efficiency of burning (i.e., combustion efficiency) of the well fluids by one or more of the burning devices 226, 227. At least a portion of the gas monitoring system 128 may be located and/or operate in association with one or more of the burning devices 226, 227, such as may permit the gas monitoring system 128 to monitor the various properties of the gas plume. The data processing system 249 may operate in conjunction with the gas monitoring system 128 or the data processing system 249 may be or form a portion of the gas monitoring system 128. The data processing system 249 may be communicatively connected with the gas monitoring system 128 and operable to receive and process sensor data from the gas monitoring system 128.

Figure 4:
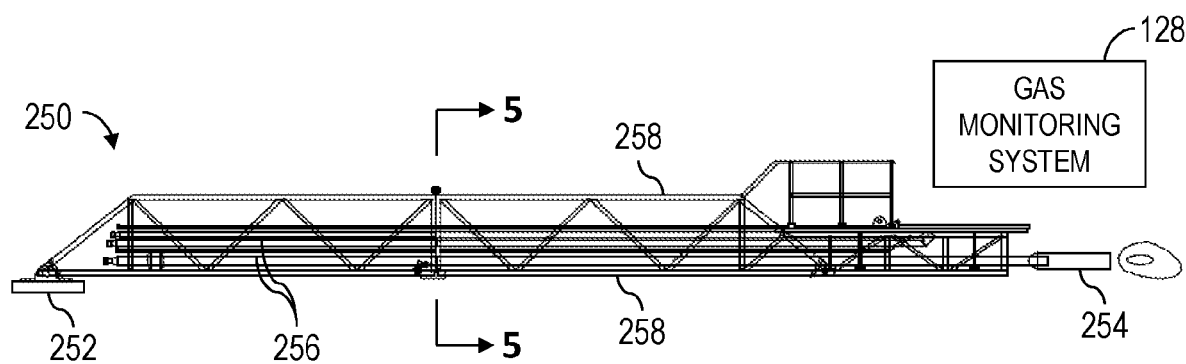
FIG. 4 is a side view of at least a portion of an example implementation of apparatus according to one or more aspects of the present disclosure.
Figure 5:
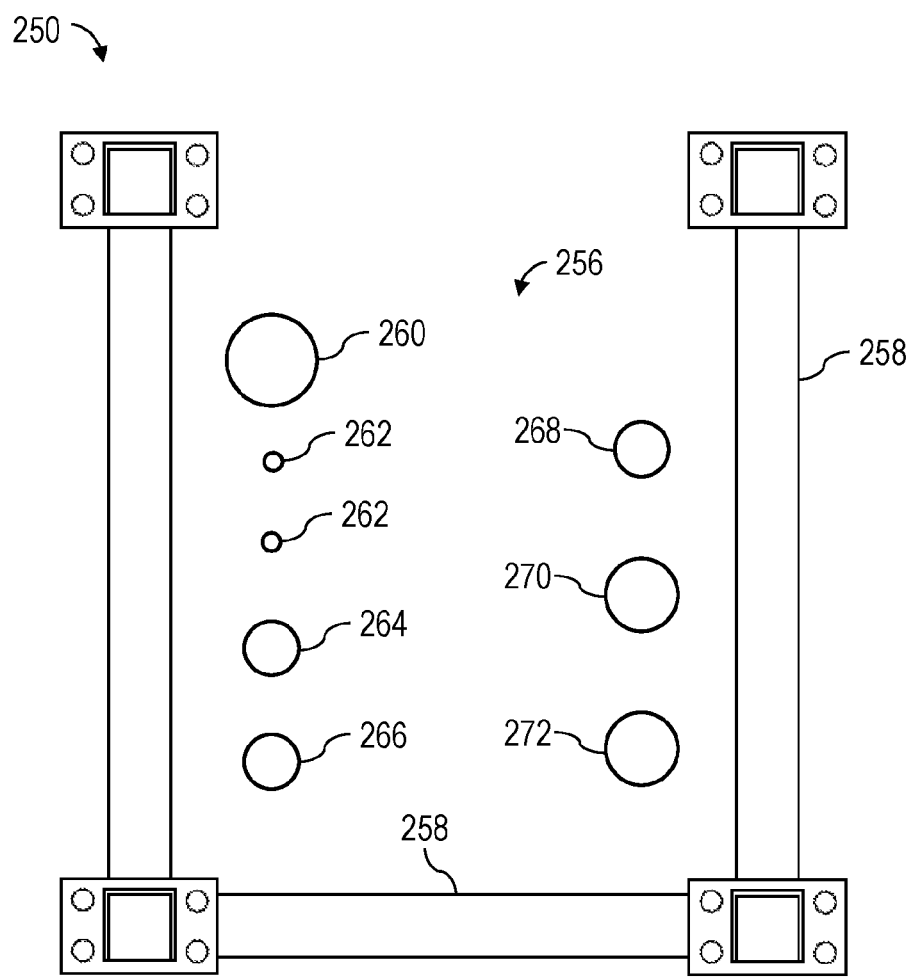
FIG. 5 is a sectional view of a portion of the apparatus shown in FIG. 4 according to one or more aspects of the present disclosure.

FIG. 4 shows an example implementation of a burning device boom 250 (e.g., a burner boom) configured for horizontal mounting, mounting at an angle, and vertical mounting. FIG. 5 is a sectional view of the burning device boom 250 shown in FIG. 4. The burning device boom 250 can be mounted on an oil and gas rig (such as a rig 520 shown in FIG. 11) via a rotating base 252 and guy lines (not shown), which may be fixed to a structure on the rig to orient or otherwise support the burning device boom 250 at an intended angle. The rotating base 252 may facilitate horizontal and vertical positioning of the burning device boom 250 and, thus, its burning device 254 (e.g., flare, burner, etc.). For example, the burning device boom 250 may be positioned slightly above horizontal so that oil left in fluid conduits 256 (e.g., piping) of the burning device boom 250 does not leak out after burning operations.

A support structure 258 (e.g., steel framing) may support the fluid conduits 256 and the burning device 254 in intended relative positions. The fluid conduits 256 of the burning device boom 250 may include, for example, one or more air conduits, a water conduit, an oil conduit, and a propane conduit. In an example implementation, the fluid conduits 256 include a supplemental gas line 260, an oil line 264, a water line 266, a water wall screen line 268, an air line 270, and a main gas line 272. The burning device boom 250 may also comprise pilot line cables 262.

The burning device 254 may be configured to burn a well fluid comprising hydrocarbons in an intended manner. For example, the burning device 254 may be operated to burn a liquid well fluid and/or a gas well fluid produced during well testing. The burning device 254 may utilize pneumatic atomization and enhanced air induction. The burning device 254 may be equipped with one or more pilots, a flame-front ignition system (BRFI), and a built-in water screen to reduce heat radiation. The burning device 254 may be fitted with an automatic shutoff valve that prevents oil spillage at the beginning and end of burning operations (e.g., a burning run). The burning device 254 may include a high turn-down feature ratio (e.g., 1:5), which optionally may be further extended to a higher ratio (e.g., 1:30) using a multirate kit (BMRK) option, which facilitates selection of the quantity of operating nozzles. For onshore operations, the burning device boom 250 may comprise a skid configured to facilitate skid-mounting. The burning device 254 may be suited for high-efficiency burning with one or more types of oil (e.g., including particularly heavy and waxy oils). For example, the burning device 254 may operate effectively up to a water-cut rating (e.g., up to 25 percent water-cut), which may be optimal for various types of cleanup operations. The burning device 254 may be operational in a manner that provides for substantially no liquid fallout and substantially no visible smoke emissions, making such burning device 254 particularly suited for operations in environmentally sensitive areas.

The burning operations performed by the burning device 254 may be monitored by a gas monitoring system 128 operable to monitor various properties of a gas plume produced by burning of well fluids (e.g., oil and/or gas) during burning operations performed by the burning device 254. For example, the gas monitoring system 128 may be operable to monitor concentrations and/or rates at which various individual component gases within or forming the gas plume are produced (i.e., emitted) by the burning of the well fluids via the burning device 254. The gas monitoring system 128 may also or instead be operable to monitor efficiency of the burning (i.e., combustion efficiency) of the well fluids by the burning device 254. At least a portion of the gas monitoring system 128 may be located and/or operate in association with the burning device 254, such as may permit the gas monitoring system 128 to monitor the various properties of the gas plume.

The present disclosure is further directed to a system and methods (i.e., processes, operations, etc.) for measuring or otherwise monitoring various properties of a gas plume produced by burning of a hydrocarbon effluent during burning operations performed at a worksite or a facility by a burning device. The hydrocarbon effluent may comprise, for example, well fluids (e.g., oil and/or gas) that are burned at a wellsite by a burner or flare during well testing operations described above. The system and methods according to one or more aspects of the present disclosure may be used to estimate, calculate, or otherwise determine, in real-time, flow rates of individual component gases within or forming the gas plume that are produced (i.e., emitted) by the burning (i.e., combusting) of the hydrocarbon effluent via the burning device. The system and methods according to one or more aspects of the present disclosure may also or instead be used to determine efficiency of the burning (i.e., combustion efficiency) of the hydrocarbon effluent via the burning device. Such determinations may be based on the composition (e.g., chemical analysis) and flow rate (e.g., flow rate measurements) of the hydrocarbon effluent that is being transmitted to the burning device, as well as optical spectroscopy analysis of the gas plume that is being produced by the burning of the hydrocarbon effluent via the burning device.

Figure 6:
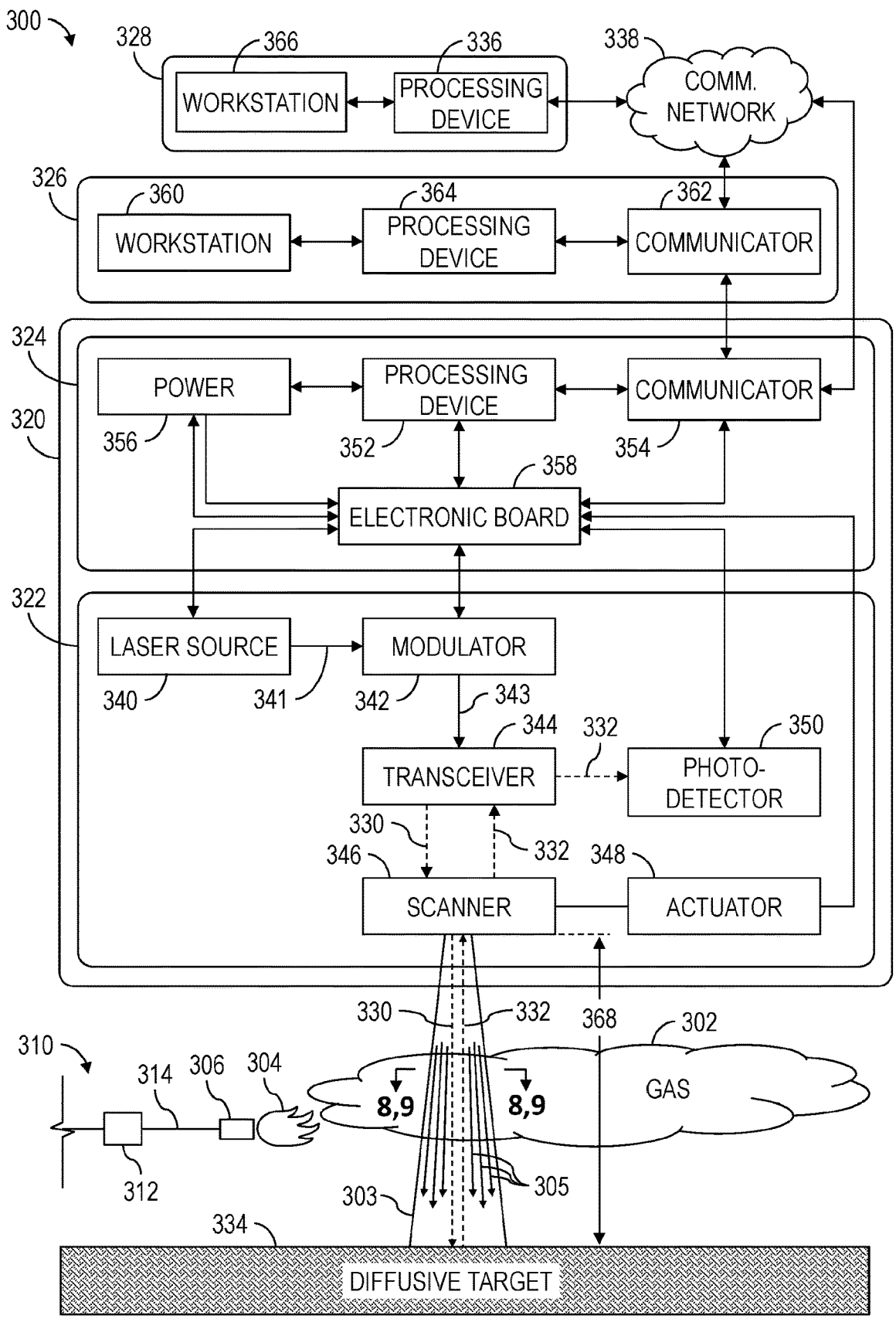
FIG. 6 is a schematic view of at least a portion of an example implementation of apparatus according to one or more aspects of the present disclosure.

FIG. 6 shows an example implementation of a gas monitoring system 300 operable to determine various properties of a gas plume 302 that is being produced by burning 304 of a hydrocarbon effluent being transmitted (i.e., flowing) to a burning device 306 at a hydrocarbon burning facility 310. The hydrocarbon burning facility 310 may be a hydrocarbon (e.g., oil and/or gas) producing facility (e.g., the marine environment 102 or the land environment 104 shown in FIG. 1) at which burning of at least a portion of the produced hydrocarbons is performed, such as during well testing operations and/or during hydrocarbon production operations. However, it is to be understood that the gas monitoring system 300 may instead be utilized at or in association with other facilities, such as hydrocarbon distribution, processing, and/or refining facilities at which burning of hydrocarbons is performed, but at which the hydrocarbons are not necessarily produced. If the hydrocarbon effluent is or comprises oil, the burning device 306 may be or comprise a burner operable to burn the oil. If the hydrocarbon effluent is or comprises a gas, the burning device 306 may be or comprise a flare. Thus, for the sake of clarity and ease of understanding, the term "burning device" herein is to be interpreted as either an oil-combusting burner or a gas-combusting flare.

The gas monitoring system 300 may comprise a flow rate sensor 312 fluidly or otherwise operatively connected along a fluid conduit 314 fluidly connecting a source (not shown) of the hydrocarbon effluent and the burning device 306. The flow rate sensor 312 may be operable to facilitate measuring or otherwise obtaining the volumetric and/or mass flow rate of the hydrocarbon effluent. The flow rate sensor 312 may be operable to output or otherwise facilitate flow rate data indicative of the flow rate of the hydrocarbon effluent within the fluid conduit 314. The flow rate sensor 312 may be an electrical flow rate sensor operable to output electrical flow rate data indicative of the measured flow rate. The flow rate sensor 312 may be a Coriolis flowmeter, a turbine flowmeter, or an acoustic flowmeter, among other examples.

The gas monitoring system 300 may further comprise a laser system 320 located in association with the hydrocarbon burning facility 310 or at the worksite comprising the hydrocarbon burning facility 310. The laser system 320 may be located and/or operate in association with the burning device 306, such that the gas plume 302 is within a field of view of the laser system 320 and, thus, permits the gas monitoring system 300 to monitor the properties of the gas plume 302. The laser system 320 may comprise a laser emission and detection system 322, such as may have one or more aspects in common with or similar to a laser system as described in PCT Patent Publication No. WO2021023971A1, the entirety of which is hereby incorporated herein by reference. The laser emission and detection system 322 is operable to emit one or more laser beams 330 that pass through the gas plume 302. The laser emission and detection system 322 is operable to detect (i.e., measure) the intensity of a reflected (i.e., backscattered) portion (hereinafter "backscatter" or "reflection") 332 of the laser beam(s) 330 that, after passing through the gas plume 302 and being backscattered by a diffusive target 334 (e.g., land surface, water surface, a building surface, a barrier, etc.), returns to the laser emission and detection system 322. The laser system 320 may further comprise a power and control system 324 operable to supply electrical power to and control the laser emission and detection system 322.

The gas monitoring system 300 may comprise a local data processing system 326 located in association with the hydrocarbon burning facility 310 or at the worksite comprising the hydrocarbon burning facility 310. The gas monitoring system 300 may comprise a remote data processing system 328 located at a remote location (i.e., a different worksite from the worksite at which the hydrocarbon burning facility 310 is located). The local data processing system 326 and the remote data processing system 328 may each be communicatively connected with the laser system 320 and operable to process (i.e., analyze) sensor data output by the laser system 320 to determine the properties of the gas plume 302. The local data processing system 326 and the remote data processing system 328 may each be communicatively connected with the laser system 320 via one or more communication networks 338 (e.g., the internet, a cellular communication network, a satellite communication network, a wide area network (WAN), a local area network (LAN), etc.).

The laser emission and detection system 322 and the power and control system 324 of the laser system 320 may be located in close association with each other and be electrically, communicatively, and/or physically connected with each other. For example, the systems 322, 324 may be or form at least a portion of the same device, assembly, or unit. Similarly, the local data processing system 326 may be located in close association with the laser system 320 and be electrically, communicatively, and/or physically connected with the laser system 320. For example, the laser system 320 and the local data processing system 326 may be or form at least a portion of the same device, assembly, or unit. In such implementations, communication between the laser system 320 and the local data processing system 326 may be performed via wired communication means. However, the local data processing system 326 may be electrically and/or communicatively connected with the laser system 320, but the local data processing system 326 may be or form at least a portion of a device, assembly, or unit that is separate from the laser system 320. In such implementations, the local data processing system 326 may be located at a distance (e.g., several meters to several hundred meters or more) from the laser system 320 and communication between the laser system 320 and the local data processing system 326 may be performed via wired or wireless communication means.

The laser emission and detection system 322 may comprise a laser source 340 (e.g., a distributed feedback (DFB) laser device, a semiconductor laser device, a diode laser device, a narrow-linewidth laser device, an indium phosphide laser device, etc.) operable to emit a laser beam 341. The wavelength of the laser beam 341 may be tuned by changing the duration and/or magnitude of the electrical current input to the laser source 340 from the power and control system 324. The laser beam 341 may be modulated, such as via a modulator 342 operable to modulate the continuous laser beam 341 into a random or quasi-random bit stream, to thereby impart a modulated signal to or within the laser beam 341. The modulated signal within a modulated laser beam 343 may be used for cross-correlating the laser beam 330 output by the laser emission and detection system 322 with corresponding backscatter 332.

As depicted in figures described below, the laser source 340 may comprise one or more laser sources operable to emit first and second laser beams. Thus, reference below to a laser beam may also refer to, be applicable to, or be readily adapted for two or more laser beams. In implementations utilizing such first and second (or more) laser beams, among others within the scope of the present disclosure, the modulator 342 may comprise one or more modulators operable to modulate at least one of the first and second laser beams according to a modulation scheme such that the at least one of the first and second laser beams comprises a modulated signal. The first and second laser beams may be modulated according to first and second modulation schemes that are the same or different.

The tuned and modulated laser beam 343 may then be directed to a transceiver 344. The laser beams 341, 343 may be transmitted between the laser source 340, the modulator 342, and the transceiver 344 via corresponding fiber optic cables (not shown). The transceiver 344 may comprise a plurality of lenses and/or mirrors collectively operable to output a laser beam 330 into free space, such as by focusing and directing the laser beam 343 to travel through the free space toward a scanner 346.

The scanner 346 may be or comprise a mirror, a set of optical wedges, optical prisms, and/or other means operable to direct the laser beam 330 in an intended direction, such as along a path 305 through a laser data acquisition space 303 (i.e., an air column) extending through or otherwise containing at least a portion of the gas plume 302 that is to be tested for one or more properties. The scanner 346 may be mechanically or otherwise operatively connected to an actuator 348 (e.g., an electric motor) operable to move (e.g., rotate) the scanner 346 to change the direction of the laser beam 330. The actuator 348 may repeatedly and continuously move (e.g., oscillate) the scanner 346 to repeatedly and continuously change direction of (i.e., scan) the laser beam 330 to thereby direct the laser beam 330 along a plurality of paths 305 through the space 303 extending through or otherwise containing the gas plume 302. The backscatter 332 of the laser beam 330 that passes through the space 303 may be received by the scanner 346 and directed to the transceiver 344, which may then direct the backscatter 332 to a photodetector 350 operable to detect (i.e., measure) intensity of the backscatter 332.

The photodetector 350 may be operable to output or otherwise facilitate determining intensity data indicative of the intensity of the backscatter 332 received by the photodetector 350. The photodetector 350 may be or comprise one or more semiconductor-based photodetector devices, single-photon detector devices, single-photon avalanche diodes (SPADs), avalanche photodiodes (APDs), linear-mode APDs, silicon-based detector devices, and/or indium gallium arsenide-based detector devices. The photodetector 350 may be or comprise one or more complementary metal-oxide-semiconductor (CMOS) devices, in which at least a part of the photodetector 350 may be manufactured using a CMOS manufacturing process.

The power and control system 324 may comprise a processing device 352 (e.g., a computer, a PLC, etc.), a communication device 354, and a power source 356 (e.g., a power distribution device, an electrical amplifier, a battery, etc.). An electronics board 358 and/or other electrical circuitry may communicatively (i.e., electrically) connect the processing device 352 to the devices of the laser emission and detection system 322. The electronics board 358 may facilitate transfer of data (e.g., sensor data, control commands, etc.) between the processing device 352 and one or more of the power source 356, the communication device 354, the laser source 340, the modulator 342, the transceiver 344, the photodetector 350, and the actuator 348. The electronics board 358 may also facilitate transfer of electrical power from the power source 356 to one or more of the processing device 352, the communication device 354, the laser source 340, the modulator 342, the transceiver 344, the photodetector 350, and the actuator 348.

The local data processing system 326 may comprise a processing device 364 and a communication device 362. The remote data processing system 328 may comprise a processing device 336 and a communication device (not shown). The communication device 362 and the communication device of the remote data processing system 328 may facilitate transmission of data (e.g., sensor data) from the processing device 352 of the laser system 320 to the processing devices 364, 336, respectively, and transmission of data (e.g., control commands) from the processing devices 364, 336, respectively, to the processing device 352 of the laser system 320. The processing devices 336, 364 may be communicatively connected with (e.g., via respective communication devices) the flow rate sensor 312 and operable to receive and process the flow rate data facilitated by the flow rate sensor 312. Each processing device 336, 352, 364 may be operable to receive, process, and output data to monitor operations of and/or provide control to one or more devices or portions of the gas monitoring system 300. Each processing device 336, 352, 364 may store executable program code, instructions, and/or operational parameters or setpoints, including for implementing one or more methods (e.g., processes, operations, etc.) described herein. The processing devices 336, 352, 364 may collectively form a processing system operable to control or otherwise cause the gas monitoring system 300 to perform one or more methods described herein.

Each data processing system 326, 328 may comprise or be communicatively connected with a corresponding workstation 360, 366 usable by a human operator (e.g., rig personnel) to monitor and control various devices of the gas monitoring system 300, such as the flow rate sensor 312 and/or the devices of the laser system 320. Each control workstation 360, 366 may be communicatively connected with a corresponding processing device 364, 336. For example, each control workstation 360, 366 may be operable for entering or otherwise communicating control commands to a corresponding processing device 364, 336 by the human operator, and for displaying or otherwise communicating information from the corresponding processing device 364, 336 to the human operator. Each control workstation 360, 366 may comprise one or more input devices (e.g., a keyboard, a mouse, a joystick, a touchscreen, etc.) and one or more output devices (e.g., a video monitor, a touchscreen, a printer, audio speakers, etc.). Each control workstation 360, 366 may be communicatively connected with the processing device 352 via the communicative connection between the data processing systems 326, 328 and the laser system 320. The workstation 360 may be located within a monitoring and control center (e.g., a room, a cabin, a trailer, etc.) at the worksite comprising the hydrocarbon burning facility 310. The workstation 366 may be located within a monitoring and control center located a different worksite from the worksite at which the hydrocarbon burning facility 310 is located.

The processing device 352 may be operable to monitor and control operation of the laser system 320. For example, the processing device 352 may cause the power source 356 to output electrical power to the laser source 340 to cause the laser source 340 to emit the laser beam 341. The processing device 352 may cause the scanner 346 to direct the laser beam 330 along a path 305 through the space 303 containing the gas plume 302. The processing device 352 may cause the power source 356 to vary the electrical power supplied to the laser source 340 to thereby tune (i.e., vary, scan, sweep, etc.) the wavelength of the laser beam 330 around (or through) a wavelength corresponding to a spectral absorption line of a predetermined (i.e., target) gas. The processing device 352 may then receive the intensity data output by the photodetector 350 indicative of intensity of the backscatter 332 (i.e., the portion of the modulated laser beam 330 that has been backscattered by the diffusive target 334) to thereby measure intensity of the backscatter 332 after passing through the gas plume 302. The processing device 352 may instead cause the scanner 346 to direct the laser beam 330 along a plurality of paths 305 through the space 303 containing the gas plume 302. For each of the paths 305 through the space 303, the processing device 352 may tune the wavelength of the laser beam 330 around a wavelength corresponding to a spectral absorption line of a predetermined gas and receive the intensity data output by the photodetector 350 to thereby measure intensity of the backscatter 332 after passing through the gas plume 302. Predetermined (i.e., target) gases for which presence and properties in the gas plume 302 may be tested (i.e., for which the intensity of the backscatter 332 may be measured) may include, for example, CO, $CO_2$, $CH_4$, $C_2H_2$, $C_2H_4$, $C_3H_6$, NO, $NO_2$, $NO_3$, or $SO_2$, and other gases that can be produced by burning (i.e., combusting) a hydrocarbon effluent.

The processing device 352 may also determine length 368 of a path 305 between the laser emission and detection system 322 (e.g., the scanner 346) and the diffusive target 334, such as based on amount of time the laser beam 330 (and the backscatter 332) travels back and forth between the laser emission and detection system 322 and the diffusive target 334. For example, the random or quasi-random modulation may be utilized to cross-correlate the emitted laser 330 and the received backscatter 332. Thus, the processing device 352 may determine the length 368 of a path 305 through the gas plume 302 based on amount of time between when the laser beam 330 comprising a modulated signal was emitted by the laser source 340 and when the corresponding backscatter 332 comprising the modulated signal was received by the photodetector 350. Accordingly, in some respects, the laser emission and detection system 322 may operate similar to a laser imaging, detection, and ranging (LIDAR) system.

Figure 7:
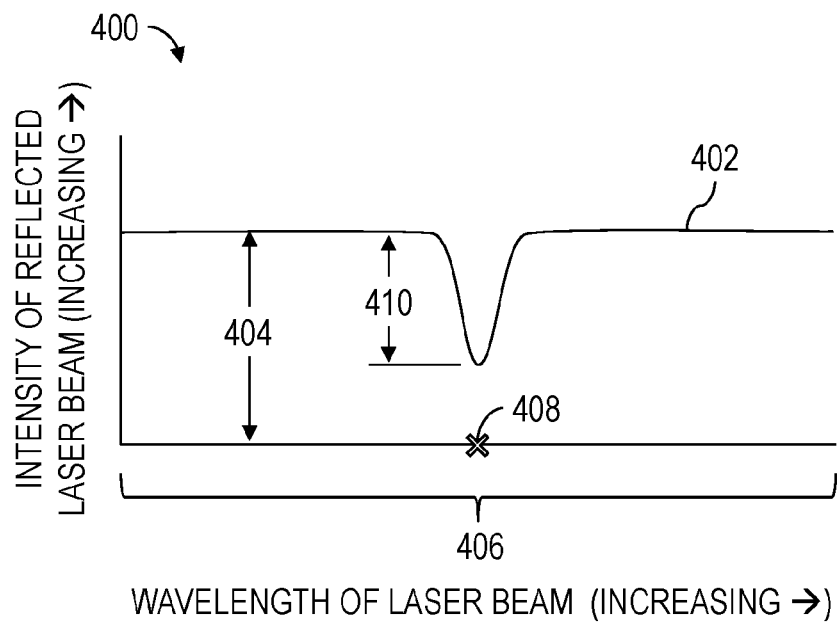
FIG. 7 is a graph according to one or more aspects of the present disclosure.

FIG. 7 is a graph 400 showing an example spectrogram 402 of a measured intensity 404 of a backscatter 332 measured by the photodetector 350 of the laser system 320 shown in FIG. 6, with respect to wavelength of the laser beam 330 (and the backscatter 332). The intensity 404 is or comprises magnitude of intensity data output by the photodetector 350 while the wavelength of the laser beam 330 is tuned (i.e., swept) through a range of wavelengths 406 including a predetermined wavelength 408 corresponding to a spectral absorption line of a predetermined (i.e., target) gas that may form or be within the gas plume 302. As the wavelength of the laser beam 330 approaches the wavelength 408 corresponding to the spectral absorption line of the predetermined gas, the intensity 404 may decrease by a measurable amount 410 based on the amount of such predetermined gas existing in the gas plume 302. Thus, if the intensity 404 experiences an attenuation 410 at a wavelength 408 corresponding to a spectral absorption line of a predetermined (i.e., target) gas, the presence of such predetermined gas is confirmed as a component gas of the gas plume 302. Depending on the wavelength 406 of the laser beam 330, the intensity 404 of the signal output by the photodetector 350 may be more or less attenuated and, thus, indicative of concentration of the component gas within the gas plume 302, such as based on the Beer-Lambert Law.

The photodetector 350 may be operable to output intensity data for a wide range of laser wavelengths. The spectrogram 402 may thus show a wide range of intensity 404 and a plurality of intensity drops 410, each associated with a corresponding spectral absorption line of a corresponding predetermined gas. The measured intensity 404 for each wavelength, or at least at the wavelength 408, may be recorded by one or more of the processing devices 336, 352, 364. Such process may be repeated for a predetermined number of different paths 305 at different locations through the space 303 containing the gas plume 302. The different wavelengths of the emitted laser beams 330 and the resulting different intensities of the detected backscatter 332 at different integration times may then be utilized to generate the spectrogram 402.

For example, a human operator or one or more of the processing devices 336, 352, 364 may select one or more predetermined gases intended to be tested for or monitored by the gas monitoring system 300, define a space 303 containing at least a portion of the gas plume 302, and define a scheme (e.g., pattern or order) for scanning the space 303 with the laser beam 330 along a plurality of paths 305 though the space 303. For each of the defined paths 305 through the space 303, the processing device 352 may then cause the laser beam 330 to be tuned around a wavelength corresponding to a spectral absorption line of the one or more predetermined gases and cause the photodetector 350 to measure intensity of the backscatter 332.

Figure 8:
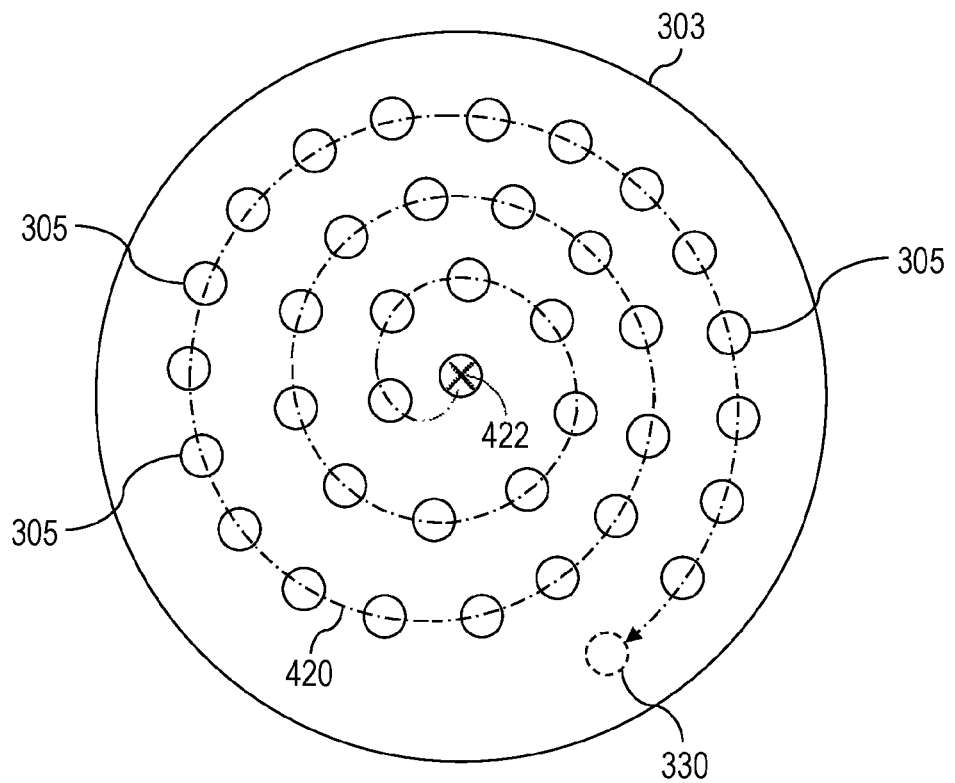
FIG. 8 is a schematic view of a portion of an example implementation of the apparatus shown in FIG. 6 according to one or more aspects of the present disclosure.
Figure 9:
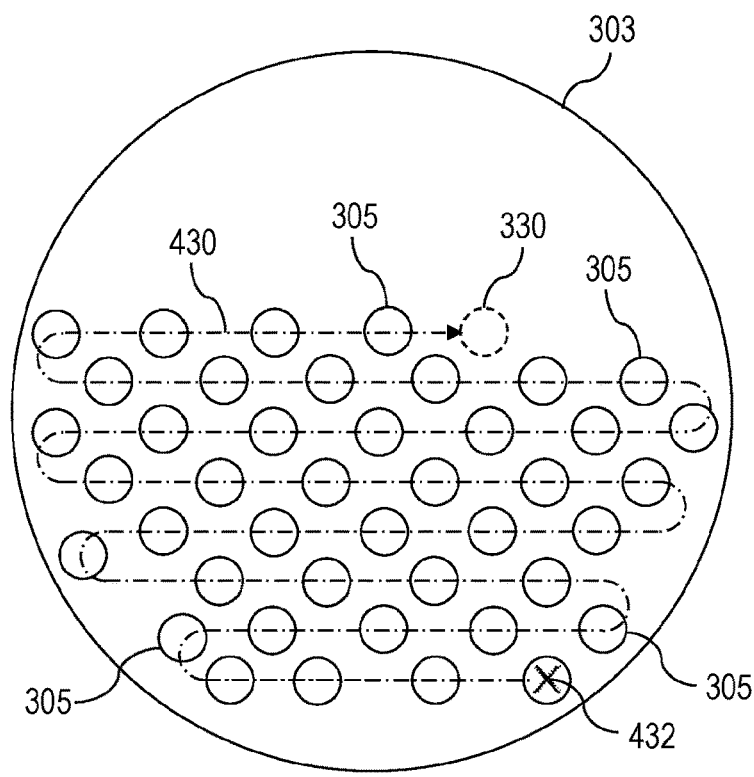
FIG. 9 is a schematic view of a portion of another example implementation of the apparatus shown in FIG. 6 according to one or more aspects of the present disclosure.

FIGS. 8 and 9 are schematic views of different schemes for scanning the space 303 containing at least a portion of the gas plume 302 shown in FIG. 6 with the laser beam 330 thereby permitting the laser beam 330 to pass the space 303 extending through the gas plume 302 along a plurality of paths 305 though the space 303. FIG. 8 shows a spiral scanning scheme 420, wherein the processing device 352 causes the scanner 346 to direct the laser beam 330 along a path 305 extending though the center 422 of the defined space 303 and then progressively directing the laser beam 330 in a spiral manner around the center 422 until the scanner 346 causes the laser beam 330 to cover (i.e., pass through) the entire defined space 303 or predetermined locations of the paths 305 through the space 303. At each location of the paths 305, the processing device 352 may cause the laser beam 330 to be tuned to different wavelengths in a range around a predetermined wavelength corresponding to a spectral absorption line of the predetermined gas, and may cause the photodetector 350 to measure intensity of the backscatter 332. FIG. 9 shows an alternating (e.g., zig-zag) linear scanning scheme 430, wherein the processing device 352 causes the scanner 346 to direct the laser beam 330 along a path 305 extending though the defined space 303 on a side 432 (i.e., a lateral position) of the space 303 and then progressively directs the laser beam 330 in an alternating linear manner toward the opposing side of the space 303 until the scanner 346 causes the laser beam 330 to cover (i.e., pass through) the entire defined space 303 or predetermined locations of the paths 305 through the space 303. Although FIGS. 8 and 9 show the spaces 303 having a circular cross-section, it is to be understood that the spaces 303 may be defined as having other cross-sectional geometries, including triangular, square, rectangular, or elliptical geometries, among other examples. The scanning through the space 303 may also have paths other than as shown in FIGS. 8 and 9, such as a simple circular path, or the scanning may not occur, such that the laser beam 330 is directed through the space 303 extending through the gas plume 302 along single path 305.

The processing device 352 may be further operable to determine (e.g., measure, calculate, estimate, etc.) concentration of a component gas within or forming the gas plume 302 along each of the paths 305 between the laser emission and detection system 322 and the diffusive target 334 based on the measured intensity 404 of the backscatter 332 of the modulated laser beam 330 along each of the paths 305. Because the concentration of the component gas is determined for an entire path 305 having a length 368, such concentration may be referred to as a "concentration path length," which may comprise units of concentration (e.g., expressed in units of parts per million (PPM)) multiplied by the path length 368 (e.g., expressed in units of meters (M)). Thus, a spectrogram (e.g., the spectrogram 402) generated by the processing device 352 may be indicative of a concentration path length of the component gas along each of the paths 305 between the laser emission and detection system 322 and the diffusive target 334.

Figure 10:
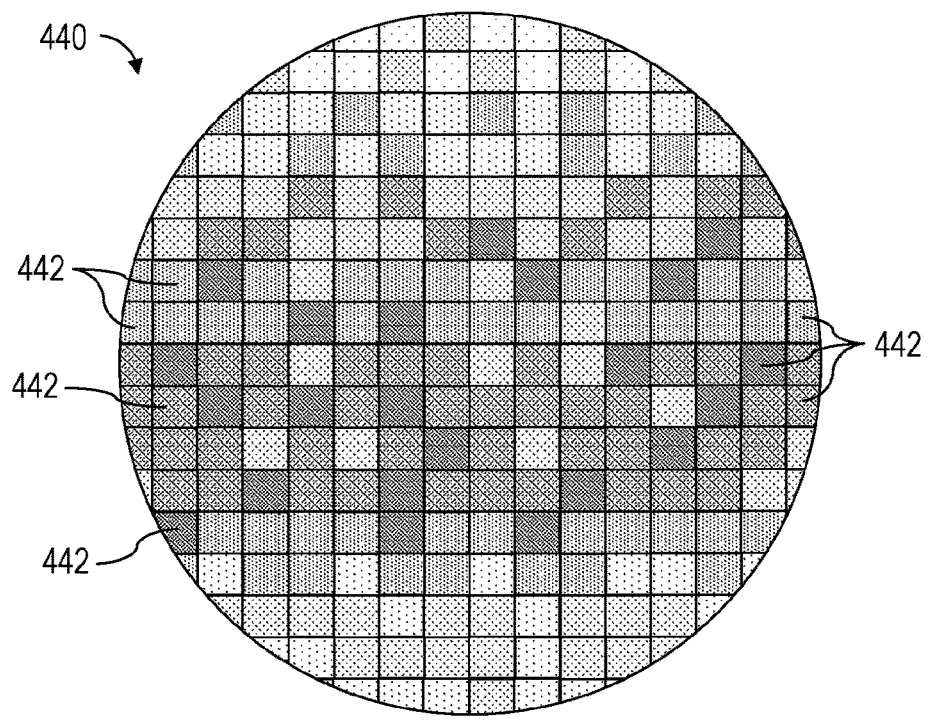
FIG. 10 is a schematic view of at least a portion of an example implementation of apparatus according to one or more aspects of the present disclosure.

FIG. 10 is an example concentration path length map 440 indicative of concentration path lengths of a component gas within a defined space 303 along a plurality of paths 305 between the laser emission and detection system 322 and the diffusive target 334. The concentration path length map 440 may thus comprise the geometric shape of a cross-section of the space 303. Each square portion 442 of the spectrogram 404 may correspond to a path 305 through the space 303 containing the gas plume 302 and comprise a different color and/or brightness indicative of a concentration path length along the corresponding path 305.

The gas monitoring system 300 may be operable to test for and determine a concentration path length of a predetermined gas, such as CO, $CO_2$, $CH_4$, $C_2H_2$, $C_2H_4$, $C_3H_6$, NO, $NO_2$, $NO_3$, $SO_2$, and other gases that can be produced by burning a hydrocarbon effluent. Because each predetermined gas possesses its own spectral properties and, thus, corresponds to a different spectral absorption line, the gas monitoring system 300 may be operated to determine a concentration path length along each path 305 for each predetermined gas.

For example, the laser emission and detection system 322 may comprise a single laser source 340 that may tune the wavelength of the laser beam 330 (i.e., the laser beam 341) through a range of wavelengths around and including spectral absorption lines of two or more predetermined gases. Thus, for each path 305, the wavelength of the laser beam 330 emitted by the laser source 340 may be swept (continuously or incrementally) through a range of wavelengths around and including the spectral absorption line of a first predetermined gas, and then the wavelength of the laser beam 330 may be swept through other range of wavelengths around and including the spectral absorption line of a second predetermined gas. The wavelength of the laser beam 330 may also be swept through other ranges of wavelengths around and including spectral absorption lines of other predetermined gases. Each laser beam 330 (i.e., intermediate laser beam 343) may be transmitted through the transceiver 344 and directed toward the scanner 346, which may direct the laser beam 330 along one or more paths 305 extending through the gas plume 302, as described herein. The photodetector 350 may then receive each corresponding backscatter 332, one at a time, and output corresponding intensity data to the processing device 352, which may then determine a concentration path length for each predetermined gas.

However, the laser system 320 may instead comprise a laser emission and detection system 322 comprising a plurality (e.g., two, three, four, or more) of dedicated devices or device sets, each operable to tune the wavelength of a corresponding laser beam 330 through a corresponding range of wavelengths around and including a spectral absorption line of a corresponding predetermined gas. For example, instead of using the same laser source 340 to tune the wavelength of the laser beam 330 through a range of wavelengths around and including spectral absorption lines of two or more predetermined gases, the laser emission and detection system 322 may comprise a plurality (e.g., two, three, four, or more) of laser sources 340, each operable to tune the wavelength of a corresponding laser beam 330 through a range of wavelengths around and including a spectral absorption line of a single predetermined gas (or, in some implementations, more than one predetermined gas when two or more predetermined gases have close absorption lines).

The laser emission and detection system 322 may also comprise a corresponding modulator 342 for each laser source 340, such as may permit each modulator 342 to modulate a corresponding tuned laser beam 330 (i.e., an intermediate laser beam 341) into a random or quasi-random bit stream, to thereby impart a modulated signal to or within the tuned laser beam 330 and, thus, permit cross-correlation (i.e., differentiation) of the backscatter 332 received by the photodetector 350 and distinguish the backscatter from noise. The tuned and modulated laser beams 330 (i.e., laser beams 343) may be simultaneously or sequentially transmitted through the transceiver 344 and directed toward the scanner 346, which may simultaneously direct the laser beams 330 along one or more paths 305 extending through the gas plume 302, as described herein. However, the scanner 346 may instead be controlled independently to scan a corresponding laser beam 330 along one or more paths 305 extending through the gas plume 302. A single or a plurality of photodetectors 350 may receive the backscatter 332 and output the intensity data to the processing device 352. For example, a single photodetector 350 may receive a plurality of backscatters 332 and output the resulting intensity data to the processing device 352, which may then differentiate between each backscatter 332 (and the intensity data) based on the modulated signal associated with each laser beam 330 and, thus, permit the processing device 352 to determine a concentration path length for each predetermined gas.

The gas monitoring system 300 may be further operable to determine (e.g., calculate, estimate, etc.) various properties of the gas plume 302, such as a rate of emission (i.e., flow rate) of each component gas within or forming the gas plume 302 and/or combustion efficiency of the hydrocarbon effluent during the burning operations. The rate of emission of each component gas may be determined based on knowledge of the composition and flow rate of the hydrocarbon effluent that is being transmitted to the burning device 306, as well as a concentration path length of each component gas detected in the gas plume 302 relative to concentration of $CO_2$ gas within the gas plume 302.

Determination of the rate of emission of each component gas may be based on chemical analyses and assumptions related to the hydrocarbon effluent that is being burned. For example, oil produced from a well can be generally described by the formula $C_xH_{2x}$, yielding Equation (1) set forth below:

$$M_{oil} = xM_C + 2xM_H \quad (1)$$

where $M_{oil}$ is the molar mass of the oil in grams per mole (g/mol), $M_C$=12 g/mol, and $M_H$=1 g/mol.

A perfect combustion of oil can be represented by Equation (2) set forth below:

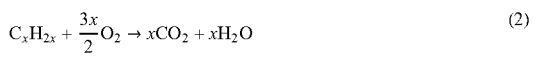

Molar flow rate of oil burned by the burning device 306 can be expressed as set forth below in Equation (3):

$$Qm_{oil} = \frac{\rho_{oil} \cdot Q_{oil}}{M_{oil} \cdot 10^{-3}} \; [\text{mol/s}] \quad (3)$$

where $\rho_{oil}$ is the density of oil in kg/m³, $Q_{oil}$ is the volumetric flow rate of oil in m³/s, and $M_{oil}$ is the molar mass of oil in g/mol.

Therefore, molar flow rate of $CO_2$ gas produced can be expressed as set forth below in Equation (4):

$$Qm_{CO_2} = x \cdot Qm_{oil}[\text{mol/s}] \quad (4)$$

Volumetric flow rate of $CO_2$ gas can then be expressed as set forth below in Equation (5):

$$Q_{CO_2} = x \frac{\rho_{oil} \cdot Q_{oil}}{M_{oil}} \cdot V_m \; [\text{m}^3/\text{s}] \quad (5)$$

where $V_m$ is molar volume of 22.414 L/mol, and mass flow rate of $CO_2$ gas can be expressed as set forth below in Equation (6):

$$Q_{CO_2} = x \frac{\rho_{oil} \cdot Q_{oil} \cdot M_{CO_2}}{M_{oil}} \; [\text{kg/s}] \quad (6)$$

where $M_{CO_2}$ is the molar mass of $CO_2$ in g/mol.

In practice, combustion of oil is not perfect, resulting in other component gases, such as CO, $CH_4$, NO, $NO_2$, $NO_3$, and $SO_2$, being produced by the burning operations and, thus, contained within the gas plume 302. Because the amount of carbon before and after combustion remains constant (i.e., is conserved), gases containing carbon produced during combustion can be calculated using the conservation of carbon as set forth below in Equation (7):

$$Qm_C = Qm_{CO_2} + Qm_{CH_4} + Qm_{CO} \quad (7)$$

where $Qm_C$ [mol/s] is the molar flow rate of carbon, which is equal to molar flow rate of $CO_2$ produced during perfect combustion.

Assuming that the concentration of each of the component gases forming the gas plume 302 is representative of a relative molar flow rate of such gases, the conservation of carbon can be rewritten as set forth below in Equation (8):

$$Qm_C = Qm_{CO_2} + \frac{[CH_4]}{[CO_2]} Qm_{CO_2} + \frac{[CO]}{[CO_2]} Qm_{CO_2} \quad (8)$$

where $[CH_4]$, $[CO]$, and $[CO_2]$ are concentrations of the component gases $CH_4$, CO, and $CO_2$, respectively, in the gas plume 302. The concentrations of the component gases forming the gas plume 302 may be expressed in units of PPM.

The concentration of each component gas, as expressed by corresponding symbols within brackets "[ ]" in various equations listed herein, may be estimated or substituted with the concentration path length of that component gas. The concentration path length of each component gas may be expressed in units of PPM·M. The concentration path length of each component gas may be determined by testing (via the laser device 320) the gas plume 302 for each predetermined gas that can exist in the gas plume 302 via the methods (or processes) described herein. The concentration path length determined for each component gas found in the gas plume 302 may, thus, be used as the concentration path length of each component gas in the Equations (8)-(16) listed herein.

Molar flow rate of each component gas containing carbon may thus be expressed as set forth below in Equations (9)-(11):

$$Qm_{CO_2} = \frac{Qm_C}{1 + \frac{[CH_4]}{[CO_2]} + \frac{[CO]}{[CO_2]}} \quad (9)$$

$$Qm_{CH_4} = \frac{[CH_4]}{[CO_2]} Qm_{CO_2} \quad (10)$$

$$Qm_{CO} = \frac{[CO]}{[CO_2]} Qm_{CO_2} \quad (11)$$

where $Qm_{CO_2}$, $Qm_{CH_4}$, and $Qm_{CO}$ are the molar flow rates of the gases $CO_2$, $CH_4$, and $CO$, respectively, produced by the burning of the hydrocarbon effluent. Molar flow rates for other component gases (e.g., $C_2H_2$, $C_2H_4$, $C_3H_6$, etc.) that can be produced by the burning of the hydrocarbon effluent may be similarly determined by determining a ratio (i.e., a quotient) of the concentration path length of a component gas to the concentration path length of $CO_2$ and multiplying such ratio by the molar flow rate of $CO_2$.

The molar flow rate of each component gas not containing carbon may be similarly expressed as set forth below in Equations (12)-(15):

$$Qm_{NO} = \frac{[NO]}{[CO_2]} Qm_{CO_2} \quad (12)$$

$$Qm_{NO_2} = \frac{[NO_2]}{[CO_2]} Qm_{CO_2} \quad (13)$$

$$Qm_{NO_3} = \frac{[NO_3]}{[CO_2]} Qm_{CO_2} \quad (14)$$

$$Qm_{SO_2} = \frac{[SO_2]}{[CO_2]} Qm_{CO_2} \quad (15)$$

where $Qm_{NO}$, $Qm_{NO_2}$, $Qm_{NO_3}$, and $Qm_{SO_2}$ are the molar flow rates of the gases $NO$, $NO_2$, $NO_3$, and $SO_2$, respectively, produced by the burning of the hydrocarbon effluent.

The molar flow rate Equations (9)-(15) listed above may be utilized to determine (e.g., calculate, estimate, etc.) the rate of emission (i.e., flow rate) of each component gas during the burning operations. Although a plurality of concentration path lengths may be determined for each component gas in the gas plume 302, a single representative concentration path length for each component gas in the gas plume 302 may first be determined for use in the molar flow rate Equations (9)-(15) by applying one or more statistical analyses to the determined concentration path lengths. For example, the representative concentration path length of each component gas may be determined by calculating an average concentration path length (i.e., mean concentration path length) for the plurality of paths 305 through the space 303 extending though the gas plume 302 for each component gas that is detected (i.e., determined to have a concentration path length) in the gas plume 302. The average concentration path length may instead be determined for some of the laser paths 305 through the space 303 extending though the gas plume 302, such as a restricted region of the space 303 where the gas plume 302 comprises higher concentrations of a component gas. After the representative concentration of each component gas in the gas plume 302 is determined, one or more of the processing devices 336, 352, 364 may calculate a ratio (i.e., a quotient) of a concentration path length of each component gas to a concentration path length of $CO_2$ gas. The calculated ratios may then be used in one or more of the Equations (8)-(15) listed above to determine a molar flow rate of each component gas.

One or more of the processing devices 336, 352, 364 may then determine the flow rate at which each component gas is being produced by the burning of the hydrocarbon effluent via the burning device 306 based on the molar flow rate Equations (9)-(15) listed above for each component gas and knowledge of the composition and flow rate of the hydrocarbon effluent that is being transmitted to the burning device 306. The composition of the hydrocarbon effluent may include the molar weight and the density of the hydrocarbon effluent. Data indicative of the composition of the hydrocarbon effluent may be entered to one or more of the processing devices 336, 352, 364 by a human operator via the workstations 360, 366. Data indicative of the flow rate of the hydrocarbon effluent ($Q_{oil}$ in Equations (3) and (5)) may be facilitated by the flow sensor 312 and communicated to one or more of the processing devices 336, 352, 364 or entered to one or more of the processing devices 336, 352, 364 by a human operator via the workstations 360, 366. After one or more of the processing devices 336, 352, 364 determines the molar flow rates of each component gas using the molar flow rate Equations (9)-(15), one or more of the processing devices 336, 352, 364 may then convert such molar flow rates to mass and/or volumetric flow rate of each component gas using or otherwise based on the molar weight of the effluent, the density of the hydrocarbon effluent, and the flow rate of the hydrocarbon effluent.

The present disclosure also introduces one or more aspects pertaining to combustion efficiency (CE). CE is an example answer product that can be determined utilizing the measurements described herein, particularly in the absence of flowrate and molecular mass measurements. CE can be utilized to quantify the efficiency of the burning process and may provide feedback to act directly on the burning process. CE can be expressed as set forth below in Equation (16):

$$CE = [CO_2]/([CO_2]+[UH]+[CO]) \quad (16)$$

where UH is unburnt hydrocarbon and the brackets [ ] indicate concentration in PPM.

This quantity estimates the efficiency of the burning of the hydrocarbon effluent via the burning device 306. That is, CE is ideally 100%, meaning that each atom of carbon in the hydrocarbon is converted into $CO_2$. Utilizing one or more aspects introduced in the present disclosure, the concentration in PPM may be replaced by concentration pathlength in PPM·M, because the gases are each measured along the same path. UH can be replaced by $CH_4$ because the amounts of unburned hydrocarbons of other types are generally low relative to the amount of unburned $CH_4$, especially in natural gas. Accordingly, measuring $CO_2$, $CO$, and $CH_4$ utilizing the devices and processes described above permits determining CE. A simplification would be to measure just $CO_2$ and $CH_4$ to get an estimation of CE with a cheaper system, because the amount of CO is generally low relative to the amount of unburned $CH_4$, especially in natural gas. In this case, combustion efficiency may be determined as set forth below in Equation (17).

$$CE = [CO_2]/([CO_2]+[CH_4]) \quad (17)$$

Figure 11:
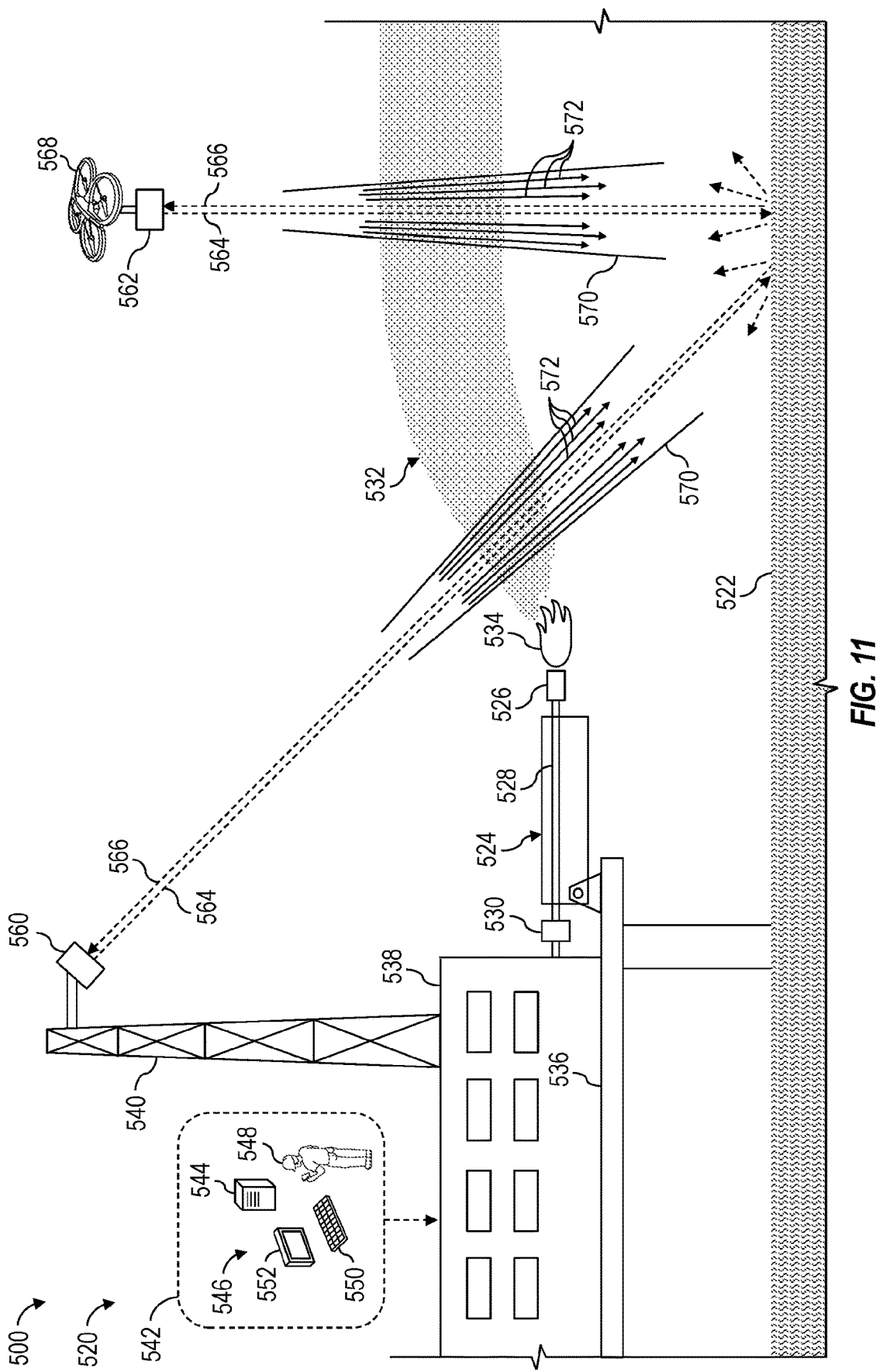
FIG. 11 is a schematic view of at least a portion of an example implementation of apparatus according to one or more aspects of the present disclosure.

FIG. 11 is a schematic view of a gas monitoring system 500 implemented in a marine environment according to one or more aspects of the present disclosure. However, one or more of the aspects described below may also be applicable or readily adaptable for environments on land instead of marine environments. The gas monitoring system 500 comprises features and modes of operation of the gas monitoring system 300 shown in FIG. 6 and described above.

The marine environment comprises an offshore oil and gas well drilling and production rig 520 located above a water surface 522. The rig 520 comprises a burner boom 524 comprising a burning device 526 and a fluid conduit 528 fluidly connecting a source (not shown) of a hydrocarbon effluent and the burning device 526. Burning 534 of the hydrocarbon effluent at the burning device 526 may produce a gas plume 532 of pollutant gases dispersed into the ambient atmosphere. The rig 520 may further comprise a rig platform or floor 536, a main complex 538, and a support structure 540 extending upward from the main complex 538. The main complex 538 or other portion of the rig 520 may comprise a monitoring and control center 542 (e.g., a room, a cabin, etc.) comprising a processing device 544 and a monitoring and control workstation 546 usable by a human operator 548 (e.g., rig personnel) to monitor and control various devices or portions of the rig 520 and the gas monitoring system 500. The control workstation 546 may be communicatively connected with the processing device 544. The control workstation 546 may be operable for entering or otherwise communicating control commands to the processing device 544 by the human operator 548, and for displaying or otherwise communicating information from the processing device 544 to the human operator 548. The control workstation 546 may comprise one or more input devices 550 (e.g., a keyboard, a mouse, a joystick, a touchscreen, etc.) and one or more output devices 552 (e.g., a video monitor, a touchscreen, a printer, audio speakers, etc.).

The gas monitoring system 500 may comprise a flow rate sensor 530 fluidly or otherwise operatively connected along the fluid conduit 528. The flow rate sensor 530 may be operable to measure volumetric and/or mass flow rate of the effluent being transferred to the burning device 526 via the fluid conduit 528. The processing device 544 may be communicatively connected with the flow rate sensor 530 and operable to receive and process the flow rate data facilitated by the flow rate sensor 530. The gas monitoring system 500 may comprise one or more laser systems 560, 562, each operable to emit one or more laser beams 564 through the gas plume 532, and to measure intensity of a backscatter 566 of each laser beam 564 by the water surface 522. Each laser system 560, 562 may tune its laser beam(s) 564 around a wavelength corresponding to a spectral absorption line of a predetermined gas. Each laser system 560, 562 may be operable to repeatedly and continuously change direction of (i.e., scan) its laser beam 564 to direct the laser beam 564 along a plurality of paths 572 through a space 570 containing at least a portion of the gas plume 532. Thus, each laser system 560, 562 may comprise one or more features and modes of operation of the laser system 320 shown in FIG. 6 and described above. The laser system 560 may be connected to or otherwise supported by the support structure 540 above or in view of the burning device 526 and, thus, in view of the gas plume 532 produced by the burning of the hydrocarbon effluent by the burning device 526. The laser system 562 may be connected to and flown over or otherwise toward the gas plume 532 via a flying device 568 (e.g., an aerial drone).

Each laser system 560, 562 may be programmed with a scheme for scanning the space 570 with the laser beam 564. Because location of the laser system 560 is fixed, the laser system 560 may be programmed just to change direction of its laser beam 564 to direct the laser beam 564 along a predetermined scanning path through the corresponding space 570. However, because the laser system 562 is mobile, the flying device 568 may be programmed to fly in a predetermined pattern and the laser system 562 may be programmed to change direction of its laser beam 564, such as to collectively direct the laser beam 564 along a predetermined scanning path through the corresponding space 570.

The processing device 544 may comprise one or more features and modes of operation of the processing device 336 of the remote data processing system 328 and/or the processing device 364 of the local data processing system 326 shown in FIG. 6 and described above. For example, the processing device 544 may be communicatively connected with each laser system 560, 562 and be further operable to receive and analyze intensity data output by each laser system 560, 562 indicative of the intensity of a corresponding backscatter 566. Based on the intensity data, the processing device 544 may determine (i.e., test) which predetermined gas is present in the gas plume 532 (thereby confirming such predetermined gas as a component gas forming the gas plume 532) and determine a concentration path length of each component gas. The processing device 544 may then determine a rate of emission of each component gas produced by burning 534 of the hydrocarbon effluent, such as based on the molar flow rate Equations (9)-(15), the molar weight of the effluent, the density of the hydrocarbon effluent, and the flow rate of the hydrocarbon effluent, as described above.

Figure 12:
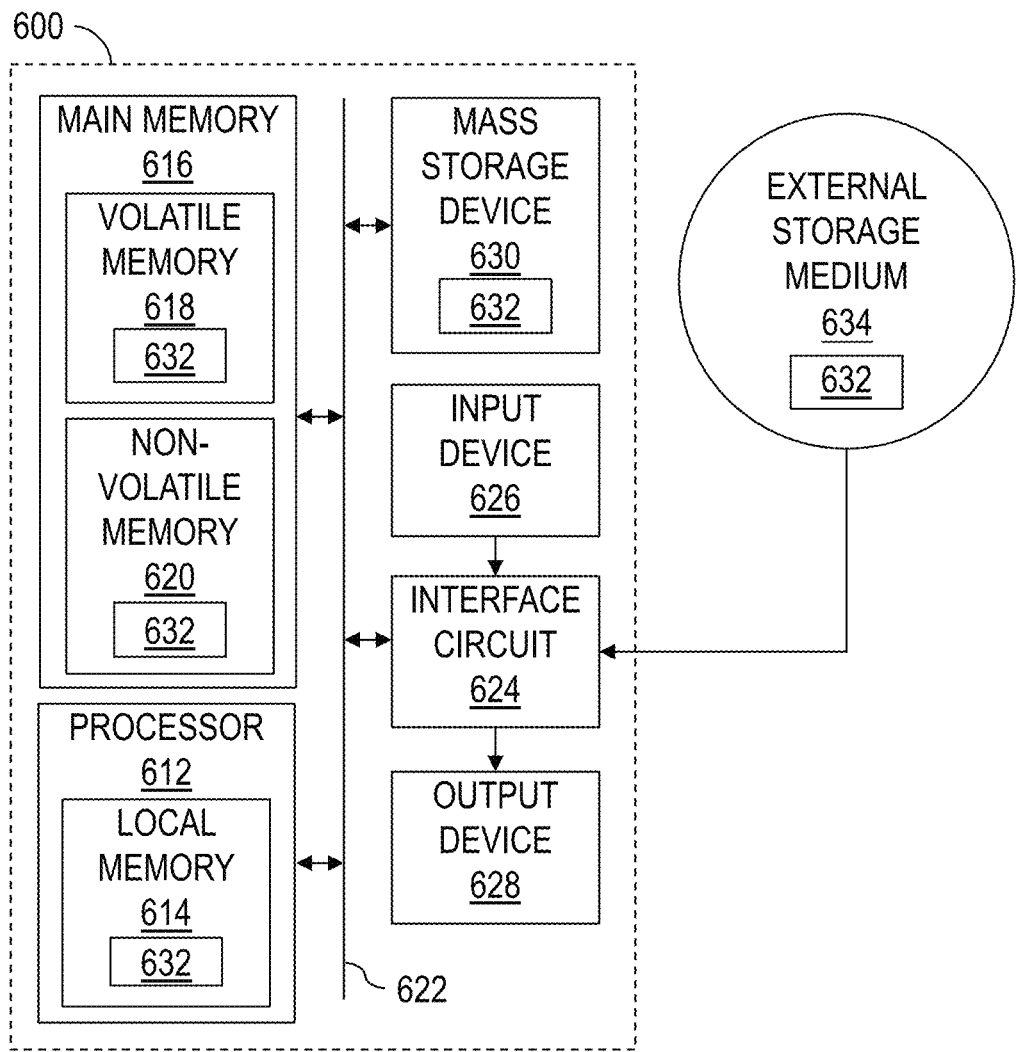
FIG. 12 is a schematic view of at least a portion of an example implementation of apparatus according to one or more aspects of the present disclosure.

FIG. 12 is a schematic view of at least a portion of an example implementation of a processing device (or system) 600 according to one or more aspects of the present disclosure. The processing device 600 may be or form at least a portion of one or more control devices and/or other electronic devices shown in one or more of the FIGS. 1-11. Accordingly, the following description refers to FIGS. 1-12, collectively.

The processing device 600 may be or comprise, for example, one or more processors, controllers, special-purpose computing devices, PCs (e.g., desktop, laptop, and/or tablet computers), personal digital assistants, smartphones, IPCs, PLCs, servers, internet appliances, and/or other types of computing devices. One or more instances of the processing device 600 may be or form at least a portion of the systems 111, 128, 249, 300, 500 or other monitoring and/or control system within the scope of the present disclosure. For example, one or more instances of the processing device 600 may be or form at least a portion of the control workstations 360, 366, 546 and/or the processing devices 336, 352, 364, 544. Although it is possible that the entirety of the processing device 600 is implemented within one device, it is also contemplated that one or more components or functions of the processing device 600 may be implemented across multiple devices, some or an entirety of which may be at a site and/or remote from the site.

The processing device 600 may comprise a processor 612, such as a general-purpose programmable processor. The processor 612 may comprise a local memory 614 and may execute machine-readable and executable program code instructions 632 (i.e., computer program code) present in the local memory 614 and/or other memory device. The processor 612 may execute, among other things, the program code instructions 632 and/or other instructions and/or programs to implement the example methods and/or operations described herein. For example, the program code instructions 632, when executed by the processor 612 of the processing device 600, may cause one or more portions or pieces of the systems 111, 128, 249, 300, 500 within the scope of the present disclosure to perform the example methods and/or operations described herein.

The processor 612 may be, comprise, or be implemented by one or more processors of various types suitable to the local application environment, and may include one or more of general-purpose computers, special-purpose computers, microprocessors, digital signal processors (DSPs), field-programmable gate arrays (FPGAs), application-specific integrated circuits (ASICs), and processors based on a multi-core processor architecture, as non-limiting examples. Examples of the processor 612 include one or more INTEL microprocessors, microcontrollers from the ARM and/or PICO families of microcontrollers, embedded soft/hard processors in one or more FPGAs.

The processor 612 may be in communication with a main memory 616, such as may include a volatile memory 618 and a non-volatile memory 620, perhaps via a bus 622 and/or other communication means. The volatile memory 618 may be, comprise, or be implemented by random-access memory (RAM), static RAM (SRAM), dynamic RAM (DRAM), synchronous DRAM (SDRAM), RAMBUS DRAM (RDRAM), and/or other types of RAM devices. The non-volatile memory 620 may be, comprise, or be implemented by read-only memory, flash memory, and/or other types of memory devices. One or more memory controllers (not shown) may control access to the volatile memory 618 and/or non-volatile memory 620.

The processing device 600 may also comprise an interface circuit 624, which is in communication with the processor 612, such as via the bus 622. The interface circuit 624 may be, comprise, or be implemented by various types of standard interfaces, such as an Ethernet interface, a universal serial bus (USB), a third-generation input/output (3GIO) interface, a wireless interface, a cellular interface, and/or a satellite interface, among others. The interface circuit 624 may comprise a graphics driver card. The interface circuit 624 may comprise a communication device, such as a modem or network interface card to facilitate exchange of data with external computing devices via a network (e.g., Ethernet connection, digital subscriber line (DSL), telephone line, coaxial cable, cellular telephone system, satellite, etc.).

The processing device 600 may be in communication with various sensors, video cameras, actuators, processing devices, control devices, and other devices of the systems 111, 128, 249, 300, 500 via the interface circuit 624. The interface circuit 624 can facilitate communications between the processing device 600 and one or more devices by utilizing one or more communication protocols, such as an Ethernet-based network protocol (such as ProfiNET, OPC, OPC/UA, Modbus TCP/IP, EtherCAT, UDP multicast, Siemens S7 communication, or the like), a proprietary communication protocol, and/or other communication protocol.

One or more input devices 626 may also be connected to the interface circuit 624. The input devices 626 may permit rig personnel to enter the program code instructions 632, which may be or comprise control data, operational parameters, operational set-points, and/or composition (e.g., molar weight, density, etc.) of various hydrocarbon effluents. The program code instructions 632 may further comprise modeling or predictive routines, equations, algorithms, processes, applications, and/or other programs operable to perform example methods and/or operations described herein. The input devices 626 may be, comprise, or be implemented by a keyboard, a mouse, a joystick, a touch-screen, a track-pad, a trackball, an isopoint, and/or a voice recognition system, among other examples. One or more output devices 628 may also be connected to the interface circuit 624. The output devices 628 may permit for visualization or other sensory perception of various data, such as sensor data, status data, and/or other example data. The output devices 628 may be, comprise, or be implemented by video output devices (e.g., an LCD, an LED display, a CRT display, a touchscreen, etc.), printers, and/or speakers, among other examples. The one or more input devices 626 and the one or more output devices 628 connected to the interface circuit 624 may, at least in part, facilitate the HMIs described herein.

The processing device 600 may comprise a mass storage device 630 for storing data and program code instructions 632. The mass storage device 630 may be connected to the processor 612, such as via the bus 622. The mass storage device 630 may be or comprise a tangible, non-transitory storage medium, such as a floppy disk drive, a hard disk drive, a compact disk (CD) drive, and/or digital versatile disk (DVD) drive, among other examples. The processing device 600 may be communicatively connected with an external storage medium 634 via the interface circuit 624. The external storage medium 634 may be or comprise a removable storage medium (e.g., a CD or DVD), such as may be operable to store data and program code instructions 632.

As described above, the program code instructions 632 may be stored in the mass storage device 630, the main memory 616, the local memory 614, and/or the removable storage medium 634. Thus, the processing device 600 may be implemented in accordance with hardware (perhaps implemented in one or more chips including an integrated circuit, such as an ASIC), or may be implemented as software or firmware for execution by the processor 612. In the case of firmware or software, the implementation may be provided as a computer program product including a non-transitory, computer-readable medium or storage structure embodying computer program code instructions 632 (i.e., software or firmware) thereon for execution by the processor 612. The program code instructions 632 may include program instructions or computer program code that, when executed by the processor 612, may perform and/or cause performance of example methods, processes, and/or operations described herein.

The present disclosure is further directed to example methods (e.g., operations, processes, actions, etc.) for monitoring and controlling devices of the systems 111, 128, 249, 300, 500. The example methods may be performed utilizing or otherwise in conjunction with one or more implementations of one or more instances of one or more components of the apparatus shown in one or more of FIGS. 1-12 and/or otherwise within the scope of the present disclosure. For example, the example methods may be at least partially performed (and/or caused to be performed) by a processing device, such as the processing device 600, executing program code instructions according to one or more aspects of the present disclosure. Thus, the present disclosure is also directed to a non-transitory, computer-readable medium comprising computer program code that, when executed by the processing device, may cause such processing device to perform the example methods described herein. The methods may also or instead be at least partially performed (or be caused to be performed) by a human operator (e.g., rig personnel) utilizing one or more implementations of one or more instances of one or more components of the apparatus shown in one or more of FIGS. 1-12 and/or otherwise within the scope of the present disclosure.

Figure 13:
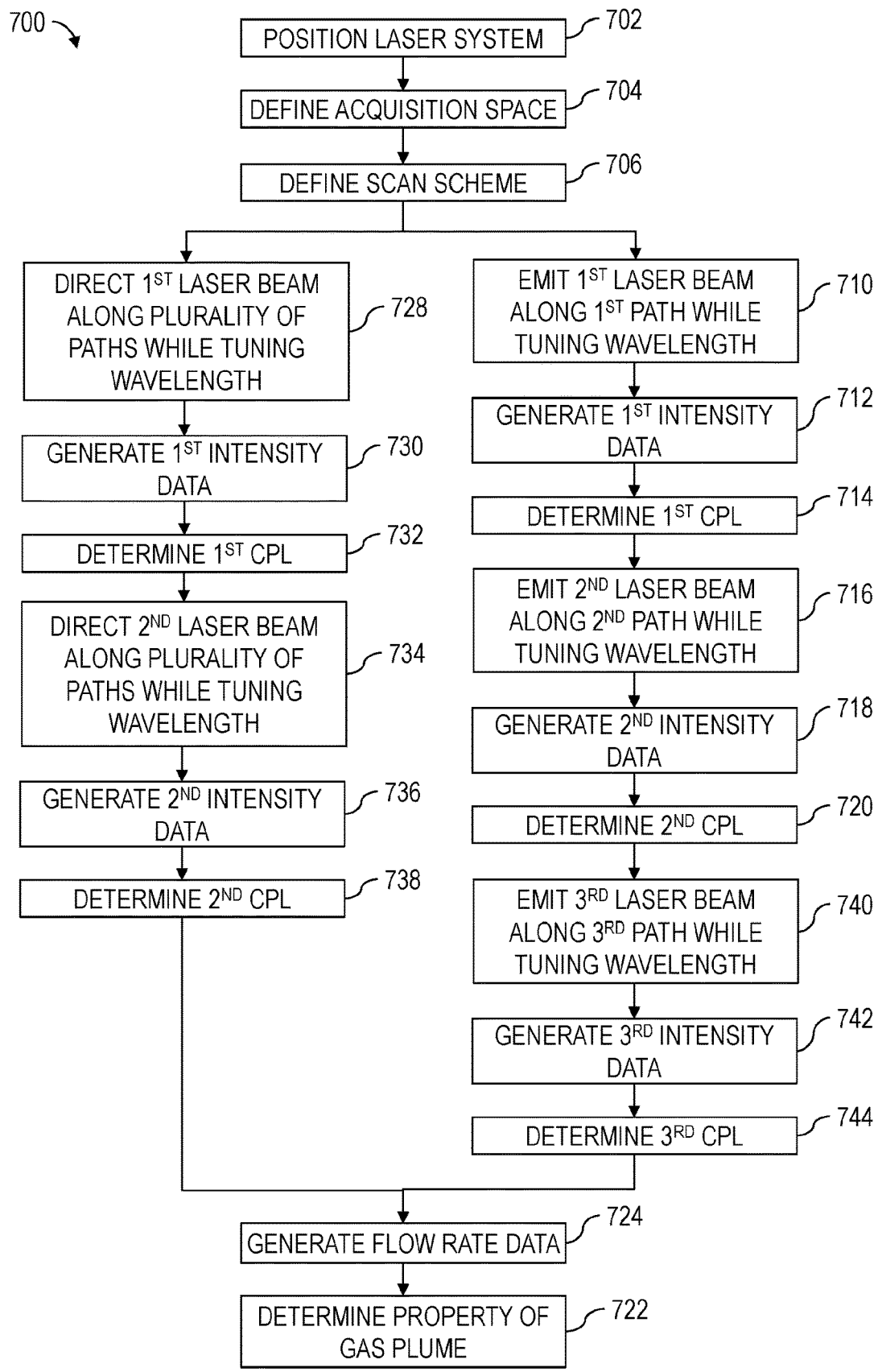
FIG. 13 is a flow-chart diagram of at least a portion of a method according to one or more aspects of the present disclosure.

FIG. 13 is a flow-chart diagram of at least a portion of an example implementation of a method (700) for determining a property of a gas plume 302 produced by burning of a hydrocarbon effluent via a burning device 306. The method (700) may be performed or otherwise implemented via or otherwise in conjunction with at least a portion of one or more implementations of one or more instances of the apparatus shown in one or more of FIGS. 1-12. Accordingly, the following description refers to FIGS. 1-13, collectively.

The method (700) may comprise positioning (702) a laser system 320 in association with the burning device 306 or at another location such that the gas plume 302 is in a field of view of the laser system 320. The method (700) may further include defining (704) an acquisition space 303 (e.g., an air column) comprising at least a portion of the gas plume 302 through which the laser system 320 may emit laser beams 330 to analyze the gas plume 302. The method (700) may further comprise defining (706) a scheme for scanning the space 303 with the laser beams 330.

The method (700) may further comprise emitting (710) a first laser beam 330 along a first path 305 through the acquisition space 303 containing at least a portion of the gas plume 302 while tuning the wavelength of the first laser beam 330 around a first wavelength 408 corresponding to a spectral absorption line of a first predetermined gas, generating (712) first intensity data indicative of a backscatter intensity 402 of the first laser beam 330, and determining (714) a first concentration path length (CPL) of the first predetermined gas along the first path 305 based on the first intensity data. The method (700) may further comprise emitting (716) a second laser beam 330 along a second path 305 through the gas plume 302 while tuning the wavelength of the second laser beam 330 around a second wavelength 408 corresponding to a spectral absorption line of a second predetermined gas, generating (718) second intensity data indicative of a backscatter intensity 402 of the second laser beam 330, and determining (720) a second concentration path length (CPL) of the second predetermined gas along the second path 305 based on the second intensity data. The first predetermined gas may be $CO_2$ and the second predetermined gas may be CO, $CO_2$, $CH_4$, $C_2H_2$, $C_2H_4$, $C_3H_6$, NO, $NO_2$, $NO_3$, or $SO_2$.

The method (700) may further comprise determining (722) the property of the gas plume 302 based on a relationship between the first and second concentration path lengths. The relationship between the first and second concentration path lengths may comprise a ratio of the second concentration path length to the first concentration path length.

The method (700) may comprise directing (728) the first laser beam along a plurality of first paths through the acquisition space 303 containing at least a portion of the gas plume 302 and, for each of the first paths through the gas plume, tuning the wavelength of the first laser beam 330 around the first wavelength 408 corresponding to the spectral absorption line of the first predetermined gas, generating (730) the first intensity data indicative of the backscatter intensity, and determining (732) the first concentration path length of the first predetermined gas based on the first intensity data. The method may further comprise directing (734) the second laser beam along a plurality of second paths through the acquisition space 303 containing the at least a portion of the gas plume 302 and, for each of the second paths through the gas plume 302, tuning the wavelength of the second laser beam 330 around the second wavelength 408 corresponding to the spectral absorption line of the second predetermined gas, generating (736) the second intensity data indicative of the backscatter intensity, and determining (738) the second concentration path length of the second predetermined gas based on the second intensity data. Determining (722) the property of the gas plume may be based on a relationship between the first concentration path lengths and the second concentration path lengths. The relationship between the first concentration path lengths and the second concentration path lengths may comprise a relationship between an average of the first concentration path lengths and an average of the second concentration path lengths.

The property of the gas plume 302 may be or comprise a rate of emission of the second predetermined gas during the burning of the hydrocarbon effluent. The method (700) may further comprise generating (724) flow rate data indicative of a volumetric and/or a mass flow rate of the hydrocarbon effluent flowing to the burning device 306. When determining the rate of emission of the second predetermined gas, determining (722) the property of the gas plume may be further based on the flow rate data. Determining (722) the property of the gas plume may be further based on the flow rate data, the density of the hydrocarbon effluent, and the molar mass of the hydrocarbon effluent.

The property of the gas plume 302 may be or comprise combustion efficiency of the hydrocarbon effluent. When the second predetermined gas has a composition comprising carbon, the method (700) may comprise determining (722) the property of the gas plume based on a ratio of the first concentration path length to a sum of the first and second concentration path lengths. When the second predetermined target gas is $CH_4$, the method (700) may also or instead comprise emitting (740) a third laser beam 330 along a third path 305 through the gas plume 302 while tuning the wavelength of the third laser beam 330 around a third wavelength 408 corresponding to a spectral absorption line of a third predetermined gas. The third predetermined gas may be CO. The method (700) may further comprise generating (742) third intensity data indicative of backscatter intensity 402 of the third laser beam 330, and determining (744) a third concentration path length of the third predetermined gas along the third path 305 based on the third intensity data. When determining combustion efficiency, determining (722) the property of the gas plume may be based on a ratio of the first concentration path length to a sum of the first, second, and third concentration path lengths.

In view of the entirety of the present disclosure, including the figures and the claims, a person having ordinary skill in the art will readily recognize that the present disclosure introduces a gas monitoring system for determining a property of a gas plume produced by burning of a hydrocarbon effluent via a burning device, wherein the gas monitoring system comprises: (A) a laser emission system operable to emit first and second laser beams along a path passing through the gas plume; (B) a detection system operable to facilitate determining first and second intensity data indicative of intensities of the first and second laser beams, respectively, that have been backscattered by a surface after passing through the gas plume; and (C) a processing system comprising a processor and a memory device storing a computer program code that, when executed by the processor, causes the processing system to: (1) cause the laser emission system to emit the first laser beam along the path while tuning wavelength of the first laser beam around a first wavelength corresponding to a spectral absorption line of a first predetermined gas, wherein the first predetermined gas is $CO_2$; (2) cause the laser emission system to emit the second laser beam along the path while tuning wavelength of the second laser beam around a second wavelength corresponding to a spectral absorption line of a second predetermined gas; (3) determine a first concentration path length of the first predetermined gas along the path based on the first intensity data; (4) determine a second concentration path length of the second predetermined gas along the path based on the second intensity data; and (5) determine the property of the gas plume based on a relationship between the first and second concentration path lengths.

The property of the gas plume may be or comprise a rate of emission of the second predetermined gas during the burning of the hydrocarbon effluent, and the relationship between the first and second concentration path lengths may comprise a ratio of the second concentration path length to the first concentration path length.

The property of the gas plume may be or comprise a rate of emission of the second predetermined gas during the burning of the hydrocarbon effluent, the gas monitoring system may further comprise a flow rate sensor operable to facilitate determining flow rate data indicative of a volumetric and/or mass flow rate of the hydrocarbon effluent flowing to the burning device, and the computer program code (when executed by the processor) may cause the processing system to determine the property of the gas plume based also on the flow rate data.

The property of the gas plume may be or comprise a rate of emission of the second predetermined gas during the burning of the hydrocarbon effluent, the gas monitoring system may further comprise a flow rate sensor operable to facilitate determining flow rate data indicative of a volumetric and/or mass flow rate of the hydrocarbon effluent flowing to the burning device, and the computer program code (when executed by the processor) may also cause the processing system to: receive input data indicative of density and molar mass of the hydrocarbon effluent flowing to the burning device; and determine the property of the gas plume based also on the input data and the flow rate data.

The property of the gas plume may be or comprise a combustion efficiency of the hydrocarbon effluent during the burning of the hydrocarbon effluent, the second predetermined gas may have a composition comprising carbon, and the computer program code (when executed by the processor) may cause the processing system to determine the combustion efficiency based on a ratio of the first concentration path length to a sum of the first and second concentration path lengths.

The property of the gas plume may be or comprise a combustion efficiency of the hydrocarbon effluent during the burning of the hydrocarbon effluent, the second predetermined gas may be $CH_4$, the laser emission system may be further operable to emit a third laser beam along the path, the detection system may be further operable to facilitate determining third intensity data indicative of an intensity of the third laser beam that has been backscattered by the surface after passing through the gas plume, and the computer program code (when executed by the processor) may cause the processing system to: cause the laser emission system to emit the third laser beam along the path while tuning wavelength of the third laser beam around a third wavelength corresponding to a spectral absorption line of a third predetermined gas, wherein the third predetermined gas is CO; determine a third concentration path length of the third predetermined gas along the path based on the third intensity data; and determine the combustion efficiency based on a ratio of the first concentration path length to a sum of the first, second, and third concentration path lengths.

The second predetermined gas may be CO, $CO_2$, $CH_4$, $C_2H_2$, $C_2H_4$, $C_3H_6$, NO, $NO_2$, $NO_3$, or $SO_2$.

The gas monitoring system may further comprise a scanner operable to change direction of the first and second laser beams and the computer program code, when executed by the processor, may also cause the processing system to: (A) cause the scanner to direct the first and second laser beams along a plurality of paths through the gas plume; (B) for each of the paths through the gas plume: (1) cause the laser emission system to emit the first laser beam while tuning wavelength of the first laser beam around the first wavelength; (2) cause the laser emission system to emit the second laser beam while tuning wavelength of the second laser beam around the second wavelength; (3) determine the first concentration path length based on the first intensity data; and (4) determine the second concentration path length based on the second intensity data; and (C) determine the property of the gas plume based on a relationship between the first concentration path lengths and the second concentration path lengths. In such implementations, among others within the scope of the present disclosure, the computer program code (when executed by the processor) may also cause the processing system to determine the property of the gas plume based on a relationship between an average of at least some of the first concentration path lengths and an average of at least some of the second concentration path lengths.

The gas monitoring system may further comprise a modulation system operable to modulate at least one of the first and second laser beams, and the computer program code (when executed by the processor) may also cause the processing system to: cause the modulation system to modulate the at least one of the first and second laser beams according to a modulation scheme such that the at least one of the first and second laser beams comprises a modulated signal; and distinguish in a received signal the modulated laser beam that has been backscattered by the surface to the detection system after passing through the gas plume based on the modulation scheme.

The gas monitoring system may further comprise a modulation system operable to modulate at least one of the first and second laser beams, and the computer program code (when executed by the processor) may also cause the processing system to: cause the modulation system to modulate the at least one of the first and second laser beams such that the at least one of the first and second laser beams comprises a modulated signal; and determine a length of the path between the laser emission system and the surface based on amount of time between when the modulated at least one of the first and second laser beams was emitted by the laser emission system and received by the detection system.

The detection system may be or comprise a single-photon detector.

The present disclosure also introduces a method for determining a property of a gas plume produced by burning of a hydrocarbon effluent via a burning device, wherein the method comprises: emitting a first laser beam along a first path through the gas plume while tuning wavelength of the first laser beam around a first wavelength corresponding to a spectral absorption line of a first predetermined gas, wherein the first predetermined gas is $CO_2$; generating first intensity data indicative of an intensity of backscatter of the first laser beam by a surface after passing through the gas plume; determining a first concentration path length of the first predetermined gas along the first path based on the first intensity data; emitting a second laser beam along a second path through the gas plume while tuning wavelength of the second laser beam around a second wavelength corresponding to a spectral absorption line of a second predetermined gas; generating second intensity data indicative of an intensity of backscatter of the second laser beam by the surface after passing through the gas plume; determining a second concentration path length of the second predetermined gas along the second path based on the second intensity data; and determining the property of the gas plume based on a relationship between the first and second concentration path lengths.

The property of the gas plume may be or comprise a rate of emission of the second predetermined gas during the burning of the hydrocarbon effluent, and the relationship between the first and second concentration path lengths may comprise a ratio of the second concentration path length to the first concentration path length.

The property of the gas plume may be or comprise a rate of emission of the second predetermined gas during the burning of the hydrocarbon effluent, the method may further comprise generating flow rate data indicative of a volumetric and/or mass flow rate of the hydrocarbon effluent flowing to the burning device, and determining the property of the gas plume may also be based on the flow rate data.

The property of the gas plume may be or comprise a rate of emission of the second predetermined gas during the burning of the hydrocarbon effluent, the method may further comprise generating flow rate data indicative of a volumetric and/or mass flow rate of the hydrocarbon effluent flowing to the burning device, and determining the property of the gas plume may also be based on the flow rate data, density of the hydrocarbon effluent, and molar mass of the hydrocarbon effluent.

The property of the gas plume may be or comprise a combustion efficiency of the hydrocarbon effluent during the burning of the hydrocarbon effluent, the second predetermined gas may have a composition comprising carbon, and the method may further comprise determining the property of the gas plume based on a ratio of the first concentration path length to a sum of the first and second concentration path lengths.

The property of the gas plume may be or comprise a combustion efficiency of the hydrocarbon effluent during the burning of the hydrocarbon effluent, the second predetermined target gas may be $CH_4$, and the method may further comprise: emitting a third laser beam along a third path through the gas plume while tuning wavelength of the third laser beam around a third wavelength corresponding to a spectral absorption line of a third predetermined gas, wherein the third predetermined gas is CO; generating third intensity data indicative of an intensity of backscatter of the third laser beam by the surface after passing through the gas plume; and determine a third concentration path length of the third predetermined gas along the third path based on the third intensity data. In such implementations, determining the property of the gas plume may be based on a ratio of the first concentration path length to a sum of the first, second, and third concentration path lengths.

The second predetermined gas may be CO, $CO_2$, $CH_4$, $C_2H_2$, $C_2H_4$, $C_3H_6$, NO, $NO_2$, $NO_3$, or $SO_2$.

The method may further comprise: (A) directing the first laser beam along a plurality of first paths through the gas plume; (B) for each of the first paths through the gas plume: (1) tuning the wavelength of the first laser beam around the first wavelength corresponding to the spectral absorption line of the first predetermined gas; (2) generating the first intensity data indicative of the intensity of backscatter of the first laser beam by the surface after passing through the gas plume; and (3) determining the first concentration path length of the first predetermined gas based on the first intensity data; (C) directing the second laser beam along a plurality of second paths through the gas plume; (D) for each of the second paths through the gas plume: (1) tuning the wavelength of the second laser beam around the second wavelength corresponding to the spectral absorption line of the second predetermined gas; (2) generating the second intensity data indicative the intensity of backscatter of the second laser beam by the surface after passing through the gas plume; and (3) determining the second concentration path length of the second predetermined gas based on the second intensity data; and (E) determining the property of the gas plume based on a relationship between the first concentration path lengths and the second concentration path lengths. In such implementations, among others within the scope of the present disclosure, determining the property of the gas plume based on the relationship between the first concentration path lengths and the second concentration path lengths may comprise determining the property of the gas plume based on a relationship between an average of at least some of the first concentration path lengths and an average of at least some of the second concentration path lengths.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to permit the reader to quickly ascertain the nature of the technical disclosure. It is submitted with the understanding that it will not be used to interpret or limit the scope or meaning of the claims.

What is claimed is:

1. A gas monitoring system for determining a property of a gas plume produced by burning of a hydrocarbon effluent via a burning device, wherein the gas monitoring system comprises:
   one or more lasers operable to emit first and second laser beams along a path passing through the gas plume;
   one or more detectors operable to facilitate determining first and second intensity data indicative of intensities of the first and second laser beams, respectively, that have been backscattered by a surface after passing through the gas plume;
   a flow rate sensor operable to facilitate determining flow rate data indicative of a volumetric and/or mass flow rate of the hydrocarbon effluent flowing to the burning device; and
   a processing system comprising a processor and a memory device storing a computer program code that, when executed by the processor, causes the processing system to:

cause the one or more lasers to emit the first laser beam along the path while tuning wavelength of the first laser beam around a first wavelength corresponding to a spectral absorption line of a first predetermined gas, wherein the first predetermined gas is carbon dioxide ($CO_2$);

cause the one or more lasers to emit the second laser beam along the path while tuning wavelength of the second laser beam around a second wavelength corresponding to a spectral absorption line of a second predetermined gas;

determine a first concentration path length of the first predetermined gas along the path based on the first intensity data;

determine a second concentration path length of the second predetermined gas along the path based on the second intensity data; and determine the property of the gas plume based on a relationship between the first and second concentration path lengths, wherein the property of the gas plume comprises a rate of emission of the second predetermined gas during the burning of the hydrocarbon effluent, and the processing system is configured to determine the property of the gas plume based also on the flow rate data.

2. The gas monitoring system of claim 1 wherein:
the computer program code, when executed by the processor, also causes the processing system to:
receive input data indicative of density and molar mass of the hydrocarbon effluent flowing to the burning device; and
determine the property of the gas plume based also on the input data and the flow rate data.

3. The gas monitoring system of claim 1 wherein:
the property of the gas plume comprises a combustion efficiency of the hydrocarbon effluent during the burning of the hydrocarbon effluent;
the second predetermined gas has a composition comprising carbon; and
the computer program code, when executed by the processor, causes the processing system to determine the combustion efficiency based on a ratio of the first concentration path length to a sum of the first and second concentration path lengths.

4. The gas monitoring system of claim 1 wherein:
the property of the gas plume comprises a combustion efficiency of the hydrocarbon effluent during the burning of the hydrocarbon effluent;
the second predetermined gas is methane ($CH_4$);
the one or more lasers is further operable to emit a third laser beam along the path;
the one or more detectors is further operable to facilitate determining third intensity data indicative of an intensity of the third laser beam that has been backscattered by the surface after passing through the gas plume; and
the computer program code, when executed by the processor, causes the processing system to:
cause the one or more lasers to emit the third laser beam along the path while tuning wavelength of the third laser beam around a third wavelength corresponding to a spectral absorption line of a third predetermined gas, wherein the third predetermined gas is carbon monoxide (CO);
determine a third concentration path length of the third predetermined gas along the path based on the third intensity data; and determine the combustion efficiency based on a ratio of the first concentration path length to a sum of the first, second, and third concentration path lengths.

5. The gas monitoring system of claim 1 wherein the second predetermined gas is carbon monoxide (CO), carbon dioxide ($CO_2$), methane ($CH_4$), acetylene ($C_2H_2$), ethylene ($C_2H_4$), propylene ($C_3H_6$), nitric oxide (NO), nitrogen dioxide ($NO_2$), nitrogen trioxide ($NO_3$), or sulfur dioxide ($SO_2$).

6. The gas monitoring system of claim 1 further comprising a scanner operable to change direction of the first and second laser beams, wherein the computer program code, when executed by the processor, also causes the processing system to:
cause the scanner to direct the first and second laser beams along a plurality of paths through the gas plume;
for each of the paths through the gas plume:
cause the one or more lasers to emit the first laser beam while tuning wavelength of the first laser beam around the first wavelength;
cause the one or more lasers to emit the second laser beam while tuning wavelength of the second laser beam around the second wavelength;
determine the first concentration path length based on the first intensity data; and
determine the second concentration path length based on the second intensity data; and
determine the property of the gas plume based on a relationship between the first concentration path lengths and the second concentration path lengths.

7. The gas monitoring system of claim 6 wherein the computer program code, when executed by the processor, also causes the processing system to determine the property of the gas plume based on a relationship between an average of at least some of the first concentration path lengths and an average of at least some of the second concentration path lengths.

8. The gas monitoring system of claim 1 further comprising a modulation system operable to modulate at least one of the first and second laser beams, wherein the computer program code, when executed by the processor, also causes the processing system to:
cause the modulation system to modulate the at least one of the first and second laser beams according to a modulation scheme such that the at least one of the first and second laser beams comprises a modulated signal; and
distinguish in a received signal the modulated laser beam that has been backscattered by the surface to the one or more detectors after passing through the gas plume based on the modulation scheme.

9. The gas monitoring system of claim 1 further comprising a modulation system operable to modulate at least one of the first and second laser beams, wherein the computer program code, when executed by the processor, also causes the processing system to:
cause the modulation system to modulate the at least one of the first and second laser beams such that the at least one of the first and second laser beams comprises a modulated signal; and
determine a length of the path between the one or more lasers and the one or more detectors based on amount of time between when the modulated at least one of the first and second laser beams was:
emitted by the one or more lasers; and
received by the one or more detectors.

10. A gas monitoring system for determining a property of a gas plume produced by burning of a hydrocarbon effluent via a burning device, wherein the gas monitoring system comprises:
one or more lasers operable to emit first and second laser beams along a path passing through the gas plume;
one or more detectors operable to facilitate determining first and second intensity data indicative of intensities of the first and second laser beams, respectively, that have been backscattered by a surface after passing through the gas plume; and
a processing system comprising a processor and a memory device storing a computer program code that, when executed by the processor, causes the processing system to:
cause the one or more lasers to emit the first laser beam along the path while tuning wavelength of the first laser beam around a first wavelength corresponding to a spectral absorption line of a first predetermined gas, wherein the first predetermined gas is carbon dioxide ($CO_2$);
cause the one or more lasers to emit the second laser beam along the path while tuning wavelength of the second laser beam around a second wavelength corresponding to a spectral absorption line of a second predetermined gas;
determine a first concentration path length of the first predetermined gas along the path based on the first intensity data;
determine a second concentration path length of the second predetermined gas along the path based on the second intensity data; and
determine the property of the gas plume based on a relationship between the first and second concentration path lengths,
wherein the property of the gas plume comprises a combustion efficiency of the hydrocarbon effluent during the burning of the hydrocarbon effluent, the second predetermined gas has a composition comprising carbon, and the computer program code, when executed by the processor, causes the processing system to determine the combustion efficiency based on a ratio of the first concentration path length to a sum of the first and second concentration path lengths.

11. The gas monitoring system of claim 10, wherein the property of the gas plume comprises a rate of emission of the second predetermined gas during the burning of the hydrocarbon effluent.

12. The gas monitoring system of claim 10, wherein:
the gas monitoring system further comprises a flow rate sensor operable to facilitate determining flow rate data indicative of a volumetric and/or mass flow rate of the hydrocarbon effluent flowing to the burning device; and
the computer program code, when executed by the processor, causes the processing system to determine the property of the gas plume based also on the flow rate data.

13. The gas monitoring system of claim 12, wherein:
the computer program code, when executed by the processor, also causes the processing system to:
receive input data indicative of density and molar mass of the hydrocarbon effluent flowing to the burning device; and
determine the property of the gas plume based also on the input data.

14. The gas monitoring system of claim 10, wherein:
the second predetermined gas is methane ($CH_4$);
the one or more lasers is further operable to emit a third laser beam along the path;
the one or more detectors is further operable to facilitate determining third intensity data indicative of an intensity of the third laser beam that has been backscattered by the surface after passing through the gas plume; and
the computer program code, when executed by the processor, causes the processing system to:
cause the one or more lasers to emit the third laser beam along the path while tuning wavelength of the third laser beam around a third wavelength corresponding to a spectral absorption line of a third predetermined gas, wherein the third predetermined gas is carbon monoxide (CO);
determine a third concentration path length of the third predetermined gas along the path based on the third intensity data; and
determine the combustion efficiency based on a ratio of the first concentration path length to a sum of the first, second, and third concentration path lengths.

15. The gas monitoring system of claim 10, wherein the second predetermined gas is carbon monoxide (CO), carbon dioxide ($CO_2$), methane ($CH_4$), acetylene ($C_2H_2$), ethylene ($C_2H_4$), propylene ($C_3H_6$), nitric oxide (NO), nitrogen dioxide ($NO_2$), nitrogen trioxide ($NO_3$), or sulfur dioxide ($SO_2$).

16. A gas monitoring system for determining a property of a gas plume produced by burning of a hydrocarbon effluent via a burning device, wherein the gas monitoring system comprises:
one or more lasers operable to emit first and second laser beams along a path passing through the gas plume;
one or more detectors operable to facilitate determining first and second intensity data indicative of intensities of the first and second laser beams, respectively, that have been backscattered by a surface after passing through the gas plume;
a scanner operable to change direction of the first and second laser beams; and
a processing system comprising a processor and a memory device storing a computer program code that, when executed by the processor, causes the processing system to:
cause the scanner to direct the first and second laser beams along a plurality of paths through the gas plume;
for each of the paths through the gas plume:
cause the one or more lasers to emit the first laser beam along the plurality of paths through the gas plume while tuning wavelength of the first laser beam around a first wavelength corresponding to a spectral absorption line of a first predetermined gas, wherein the first predetermined gas is carbon dioxide ($CO_2$);
cause the one or more lasers to emit the second laser beam along the plurality of paths through the gas plume while tuning wavelength of the second laser beam around a second wavelength corresponding to a spectral absorption line of a second predetermined gas;
determine a first concentration path length of the first predetermined gas along each path of the plurality of paths based on the first intensity data;
determine a second concentration path length of the second predetermined gas along each path of the plurality of paths based on the second intensity data; and determine the property of the gas plume based on a relationship between the first concentration path lengths and the second concentration path lengths.

17. The gas monitoring system of claim 16, wherein determining the property of the gas plume based on the relationship between the first concentration path lengths and the second concentration path lengths comprises determining the property of the gas plume based on a relationship between an average of at least some of the first concentration path lengths and an average of at least some of the second concentration path lengths.

18. The gas monitoring system of claim 16, wherein:
the property of the gas plume comprises a rate of emission of the second predetermined gas during the burning of the hydrocarbon effluent;
the gas monitoring system further comprises a flow rate sensor operable to facilitate determining flow rate data indicative of a volumetric and/or mass flow rate of the hydrocarbon effluent flowing to the burning device; and
the computer program code, when executed by the processor, also causes the processing system to:
receive input data indicative of density and molar mass of the hydrocarbon effluent flowing to the burning device; and
determine the property of the gas plume based also on the input data and the flow rate data.

19. The gas monitoring system of claim 16, wherein the property of the gas plume comprises a rate of emission, a combustion efficiency, or a combination thereof, of the second predetermined gas during the burning of the hydrocarbon effluent.

\* \* \* \* \*